United States Patent
Mano

(10) Patent No.: US 9,749,687 B2
(45) Date of Patent: Aug. 29, 2017

(54) INFORMATION PROCESSING APPARATUS, PROGRAM, AND VIDEO OUTPUT SYSTEM

(71) Applicant: Takuro Mano, Kanagawa (JP)

(72) Inventor: Takuro Mano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/769,842

(22) PCT Filed: Mar. 12, 2014

(86) PCT No.: PCT/JP2014/057425
§ 371 (c)(1),
(2) Date: Aug. 24, 2015

(87) PCT Pub. No.: WO2014/142341
PCT Pub. Date: Sep. 18, 2014

(65) Prior Publication Data
US 2015/0382059 A1    Dec. 31, 2015

(30) Foreign Application Priority Data

Mar. 13, 2013  (JP) ................................ 2013-050872
Dec. 27, 2013  (JP) ................................ 2013-272835

(51) Int. Cl.
*H04N 21/4402* (2011.01)
*H04N 9/31* (2006.01)
(Continued)

(52) U.S. Cl.
CPC ....... *H04N 21/440263* (2013.01); *G06F 3/14* (2013.01); *H04N 9/3188* (2013.01);
(Continued)

(58) Field of Classification Search
None
See application file for complete search history.

(56) References Cited

U.S. PATENT DOCUMENTS

| 7,633,641 B2 | 12/2009 | Ishii | |
| 2004/0017394 A1* | 1/2004 | Adachi | G06F 3/1454 715/744 |
| 2011/0283334 A1* | 11/2011 | Choi | G06F 3/04883 725/148 |

FOREIGN PATENT DOCUMENTS

| EP | 1 724 754 A1 | 11/2006 |
| JP | 2004-194026 | 7/2004 |

(Continued)

OTHER PUBLICATIONS

Partial Supplementary European Search Report issued Feb. 2, 2016 in Patent Application No. 14765707.6.

(Continued)

*Primary Examiner* — Kenneth B Lee, Jr.
(74) *Attorney, Agent, or Firm* — Oblon, McClelland, Maier & Neustadt, L.L.P.

(57) ABSTRACT

An information processing apparatus in communication with a video output apparatus via a wireless communication network includes a screen display unit outputting a screen on a display apparatus; a screen data acquisition unit acquiring screen data of the screen; a screen data transmission unit transmitting the screen data to the video output apparatus via the wireless communication network; an apparatus capability acquisition unit inquiring about apparatus capability of the video output apparatus and acquiring the apparatus capability from the video output apparatus; and one of a resolution change unit changing a screen resolution of the screen, which is output by the screen display unit, in accordance with the apparatus capability or an acquisition range change unit changing a range, which is acquired by the screen data acquisition unit, in accordance with the apparatus capability into a part of the screen data.

13 Claims, 41 Drawing Sheets

(51) Int. Cl.
  *H04W 4/00*   (2009.01)
  *G06F 3/14*   (2006.01)
  *H04N 21/41*  (2011.01)
(52) U.S. Cl.
  CPC ....... *H04N 9/3194* (2013.01); *H04N 21/4122* (2013.01); *H04W 4/008* (2013.01); *G09G 2340/0407* (2013.01); *G09G 2370/042* (2013.01); *G09G 2370/16* (2013.01)

(56) References Cited

FOREIGN PATENT DOCUMENTS

| | | |
|---|---|---|
| JP | 2005-339256 | 12/2005 |
| JP | 2006-106158 | 4/2006 |
| JP | 2010-206644 | 9/2010 |
| JP | 2011-076338 | 4/2011 |

OTHER PUBLICATIONS

International Search Report Issued on Jun. 17, 2014 in PCT/JP2014/057425 filed on Mar. 12, 2014.
European Official Communication dated Jul. 5, 2017 in Patent Application No. 14 765 707.6.

\* cited by examiner

VIDEO OUTPUT APPARATUS    CLIENT APPARATUS

FIG.6

| VIDEO OUTPUT APPARATUS RESOLUTION | CLIENT APPARATUS SCREEN RESOLUTION | OPERATION OF CLIENT APPARATUS |
|---|---|---|
| XGA(1024 * 768) | 1280 * 800 | SET SCREEN RESOLUTION OF CLIENT APPARATUS SAME AS RESOLUTION OF VIDEO OUTPUT APPARATUS |
| WXGA(1280 * 800) | 1280 * 800 | DO NOTHING |

FIG.11A

| | REFERENCE |
|---|---|
| CPU CRITERIA | MINIMUM SPECIFICATION IS DEFINED AS FOLLOWS CPU AFTER FOLLOWING CPU IS ASSUMED TO HAVE MORE THAN CERTAIN CAPABILITIES Intel Core2Duo, 2.0 GHz |
| MEMORY CRITERIA | MINIMUM SPECIFICATION IS DEFINED AS FOLLOWS CAPACITY MORE THAN FOLLOWING CAPACITY IS ASSUMED TO BE CERTAIN AMOUNT Memory 2 GByte |

FIG.11B

| CPU SPECIFICATION | PHYSICAL MEMORY CAPACITY | OPERATION OF CLIENT APPARATUS |
|---|---|---|
| Intel Core2Duo 1.8 GHz | 2.0 GByte | SET RESOLUTION OF CLIENT APPARATUS SAME AS RESOLUTION OF VIDEO OUTPUT APPARATUS |
| Intel Core i5 1.6 GHz | 4.0 GByte | DO NOTHING |

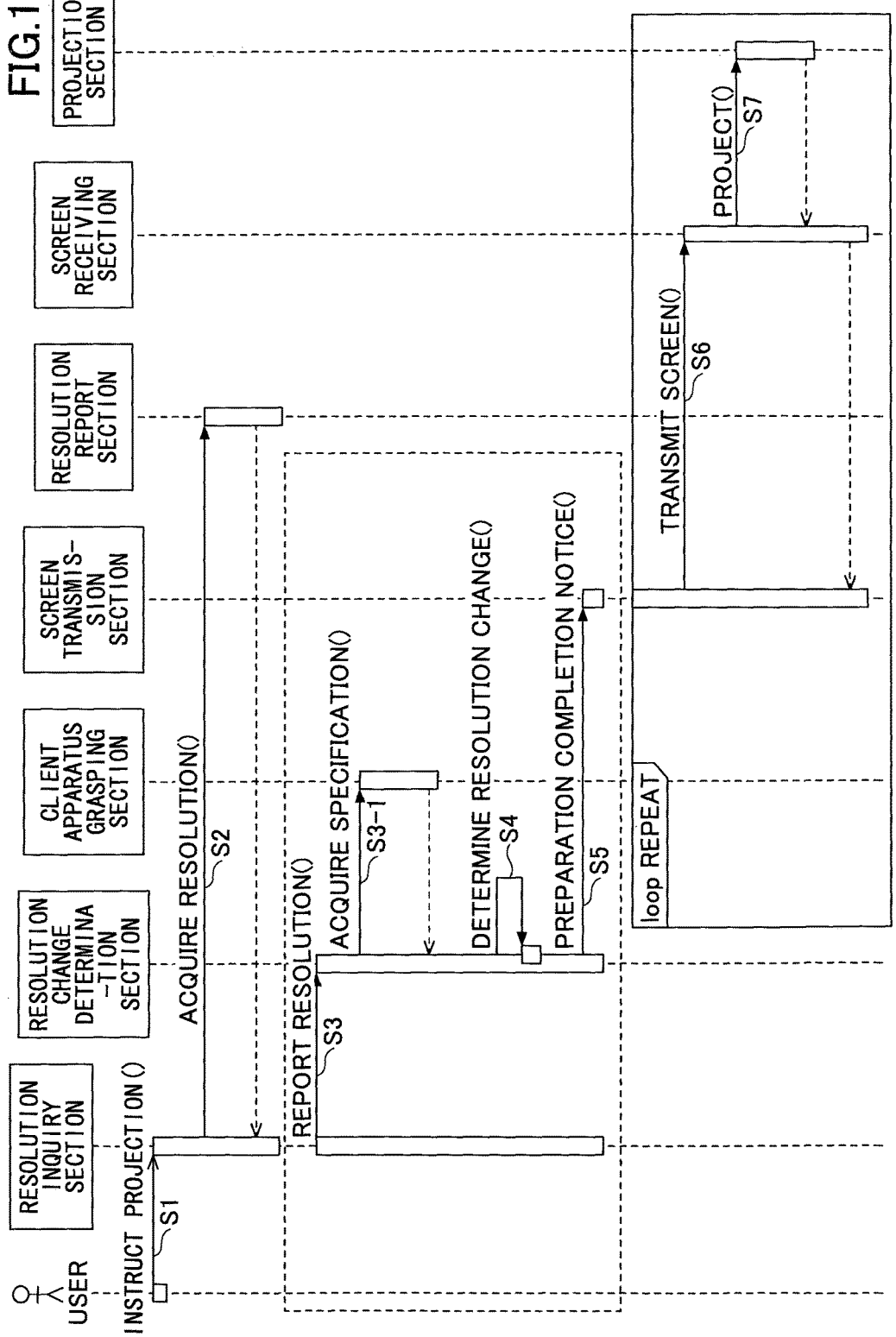

FIG.22

| RESOLUTION OF CLIENT APPARATUS | REFERENCE VALUE | OPERATION OF CLIENT APPARATUS |
|---|---|---|
| 1280 * 800 | 640 * 400 | SET LOWER RESOLUTION WHEN RESOLUTION OF CLIENT APPARATUS > REFERENCE VALUE<br>SET HIGHER RESOLUTION WHEN RESOLUTION OF CLIENT APPARATUS ≦ REFERENCE VALUE |
| 1024 * 768 | 512 * 384 | SET LOWER RESOLUTION WHEN RESOLUTION OF CLIENT APPARATUS > REFERENCE VALUE<br>SET HIGHER RESOLUTION WHEN RESOLUTION OF CLIENT APPARATUS ≦ REFERENCE VALUE |

FIG.26

| PROCESSING TIME OF VIDEO OUTPUT APPARATUS | OPERATION OF CLIENT APPARATUS |
|---|---|
| | THRESHOLD VALUE 33 ms |
| 30 ms | DO NOTHING |
| 60 ms | SET RESOLUTION OF CLIENT APPARATUS EQUAL TO RESOLUTION OF VIDEO OUTPUT APPARATUS |

FIG.36

| REPRODUCIBLE FORMAT | DATA RESOLUTION | MAXIMUM DATA RATE [Mbit/s] | MAXIMUM FRAME RATE [fps] |
|---|---|---|---|
| H.264 (VIDEO DATA) | 1920 × 1080 | 20 | 24 |
|  | 1280 × 720 | 30 | 30 |
|  | 640 × 360 | 40 | 60 |
| JPEG (STILL IMAGE DATA) | 3840 × 2160 | — | 10 |
|  | 1920 × 1080 | — | 15 |
|  | 1280 × 720 | — | 30 |

FIG.39A

| RESOLUTION<br>2560 × 1600 | | | |
|---|---|---|---|
| REPRODUCIBLE FORMAT | DATA RESOLUTION | MAXIMUM DATA RATE [Mbit/s] | MAXIMUM FRAME RATE [fps] |
| H.264 (VIDEO DATA) | 1920 × 1080 | 20 | 24 |
| | 1280 × 720 | 25 | 30 |
| | 640 × 360 | 30 | 40 |
| JPEG (STILL IMAGE DATA) | 3840 × 2160 | — | 10 |
| | 1920 × 1080 | — | 15 |
| | 1280 × 720 | — | 30 |

FIG.39B

| RESOLUTION<br>1920 × 1080 | | | |
|---|---|---|---|
| REPRODUCIBLE FORMAT | DATA RESOLUTION | MAXIMUM DATA RATE [Mbit/s] | MAXIMUM FRAME RATE [fps] |
| H.264 (VIDEO DATA) | 1280 × 720 | 25 | 30 |
| | 1280 × 720 | 20 | 40 |
| | 640 × 360 | 40 | 50 |
| JPEG (STILL IMAGE DATA) | 1920 × 1080 | — | 10 |
| | 1280 × 720 | — | 15 |

INFORMATION PROCESSING APPARATUS, PROGRAM, AND VIDEO OUTPUT SYSTEM

TECHNICAL FIELD

The present invention relates to an information processing apparatus in communication with a video output apparatus via a wireless communication network.

BACKGROUND ART

In one mode of using a projector, a Personal Computer (PC) transmits screen data, which is displayed on the display of the PC, to a projector to project the screen data. Conventionally, a PC is in wired connection with a projector using a video signal line or a network cable. However, recently, a PC and a projector are wirelessly connected via a radio network.

In this case, however, there is a hardware limitation between the PC screen resolution and the projector projected screen resolution. Generally, the resolution of a PC is higher than that of a projector. Therefore, upon receiving screen data having a resolution which is higher than a resolution a projector specification, the projector may have to perform image processing (a reduction process). Further, although if the screen data are not frequently transmitted, the projector may have enough time to complete necessary image processing, if the screen data are transmitted more frequently, a processing load of the projector is increased. As a result, a phenomenon may occur that the image processing by the projector is delayed so that, for example, the images projected by the projector may become jumpy and not all the images transmitted from the PC can be projected (hereinafter the phenomenon is referred to as a "delay phenomenon").

To resolve the problem, there is a known technique in which, when the screen delay between a PC and a projector is increased or when the projector cannot smoothly display the images, not all the screen data are transmitted by only the screen data of the part where a change is detected are transmitted (see, for example, Patent Document 1).

DISCLOSURE OF THE INVENTION

Problems to be Solved by the Invention

However, if the range of the part where the change, such as moving image, is detected is large, it may still be difficult to sufficiently reduce the processing load of the projector with the technique such as Patent Document 1 alone.

The present invention is made in light of the above problem, and may provide an image processing apparatus Capable of reducing the delay phenomenon.

Means for Solving the Problems

According to an aspect of the present invention, an information processing apparatus in communication with a video output apparatus via a wireless communication network, includes a screen display unit outputting screen on a display apparatus; a screen data acquisition unit acquiring screen data of the screen; a screen data transmission unit transmitting the screen data to the video output apparatus via the wireless communication network; an apparatus capability acquisition unit inquiring about apparatus capability of the video output apparatus and acquiring the apparatus capability from the video output apparatus; and one of a resolution change unit changing a screen resolution of a screen which is output by the screen display unit in accordance with the apparatus capability or an acquisition range change unit changing a range, which is acquired by the screen data acquisition unit, in accordance with the apparatus capability into a part of the screen data.

Effects of the Present Invention

An object of the present invention is to provide an image processing apparatus capable of reducing the delay phenomenon.

BRIEF DESCRIPTION OF THE DRAWINGS

FIG. 6 illustrates application operations corresponding to the resolution of the video output apparatus and the resolution of the client apparatus;

FIGS. 11A and 11B illustrate an example list of criteria for determining whether it is necessary for the resolution change determination section to change the resolution of the client apparatus (second embodiment);

FIG. 12 is an example sequence diagram of an operational procedure of the client apparatus and the video output apparatus (second embodiment);

FIG. 22 illustrates examples of a reference value and an application operation corresponding to the resolution of the client apparatus;

FIG. 26 illustrates an example of application operation in response to a processing time;

FIG. 36 illustrates an example reproduction capability list possessed by the video output system;

FIGS. 39A and 39B illustrate an example of plural reproduction capability lists;

EMBODIMENT TO CARRY OUT THE INVENTION

In the following, embodiments of the present invention are described with reference to the accompanying drawings. However, it should be noted that the technical scope of the preset invention is not limited to the embodiments.

First Embodiment

Figure 1:
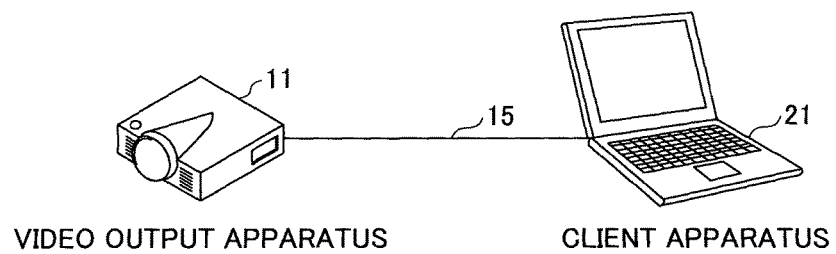
FIG. 1 illustrates an example overall configuration of a video output system.

FIG. 1 is an example block diagram of a video output system. The client apparatus 21 and a video output apparatus 11 are in communication with each other via a network 15. The client apparatus 21 refers to an information processing apparatus in a broad sense such as a Personal Computer (PC), a smartphone, a tablet terminal, a cellular phone, and a Personal Digital Assistant (PDA). Further, the client apparatus 21 may also refer to an MFP, a digital camera and a video camera when they have functions of an information processing apparatus.

The video output apparatus 11 refers to, for example, a projector which projects an image on a planar body such as a screen. The video output apparatus 11 may also refer to an apparatus that displays an image on the display thereof without projecting the image. The video output apparatus 11 outputs the screen data transmitted from the client apparatus 21.

Generally, the network 15 refers to a LAN. The network may also refer to a WAN including a plurality of LANs connected with each other using routers or the like. The network 15 includes at least a part where wireless communications are used (the network 15 is an example of the claimed wireless communication network). Further, even when the network 15 is a wired network, the client apparatus 21 and the video output apparatus 11 have a function to communicate with each other. Further, in a case of the LAN, the client apparatus 21 and the video output apparatus 11 may communicate with each other via access points or directly (ad hoc mode). Further, the network 15 is not limited to the LAN. For example, the network 15 may use Bluetooth (registered trademark) or Zigbee (registered trademark) for the communications.

Figure 2:
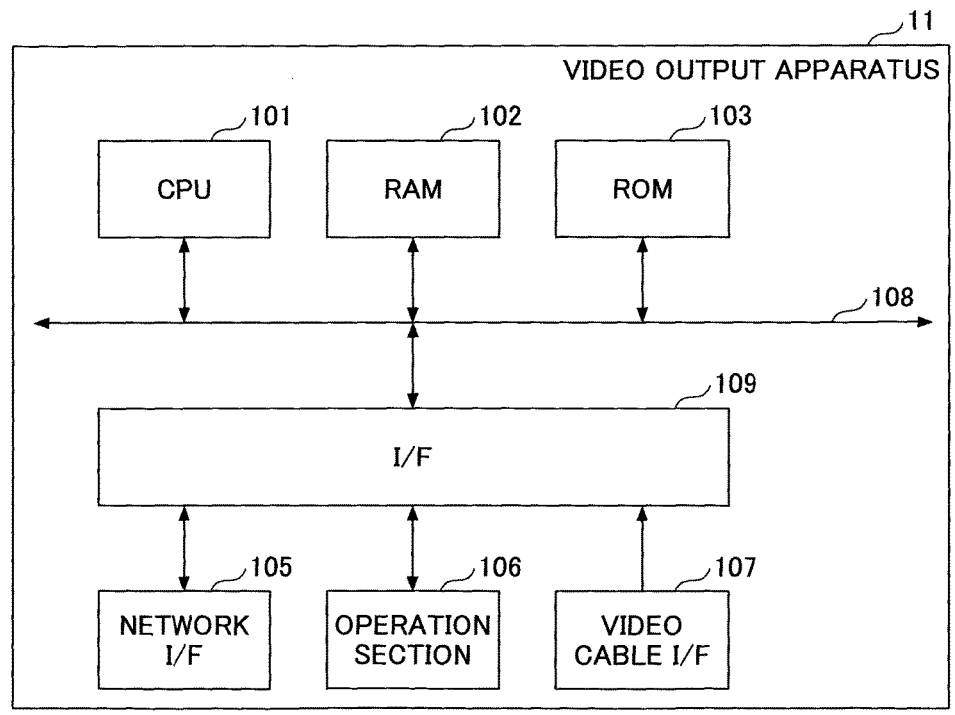
FIG. 2 illustrates an example hardware configuration of a video output apparatus.

FIG. 2 illustrates an example hardware configuration of the video output apparatus 11. The video output apparatus includes a CPU 101, a RAM 102, a ROM 103, and an I/F 109 which are connected with each other via an internal bus 108. The I/F 109 is connected to a network I/F 105, an operation section 106, and a video cable I/F 107. The ROM 103 stores a program, so that the CPU 101 executes the program stored in the ROM 103 to control the entire video output apparatus. The RAM 102 serves as a working memory of the CPU 101 and stores the screen data transmitted from the client apparatus 21. The I/F 109 may be, for example, a peripheral bus controller, a Direct Memory Access Controller (DMAC), and a bus controller, so as to store data, which are received via the network I/F 105, the operation section 106, and the video cable I/F 107, into the RAM 102. Also, the I/F 109 outputs data to the network I/F 105, the operation section 106, and the video cable I/F 107.

The network I/F 105 may be, for example, the Ethernet (registered trademark) card to connect to the LAN. A plurality of network I/Fs 105 supporting the wired LAN (IEEE802.3x) and the wireless LAN (IEEE802.11) are arranged.

The operation section 106 accepts user's operations. The operation section 106 is hard keys arranged on the video output apparatus 11. The operation section 106 may accept various operations such as settings of, for example, scaling magnification, brightness, and Keystone correction amount. Further, the operation section 106 may further include an infrared light receiving section to accept operations of a remote controller. The video output apparatus can project an operation menu, so that a participant can input a desirable setting by moving a cursor using a hard key or a remote controller and pressing a determination (return) key. The video cable I/F 107 is an I/F to acquire video data from an analogue or digital video cable.

Figure 3:
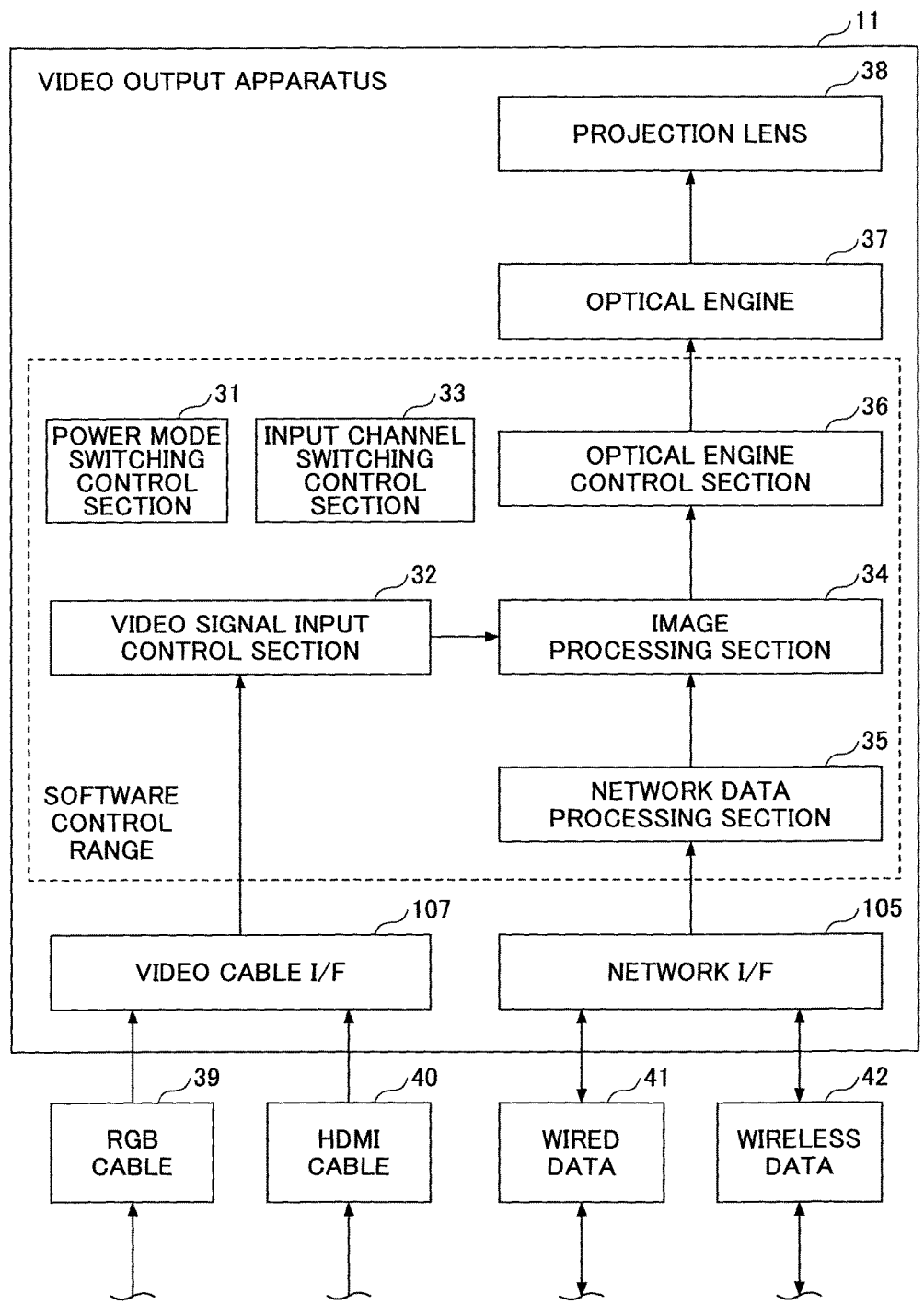
FIG. 3 is an example block diagram of the video output apparatus.

FIG. 3 illustrates an example block diagram of the video output apparatus 11. The blocks in the dotted box indicate functions that are realized by software. As described above, the video cable I/F 107 is connected to an RGB cable 39 transmitting an analogue signal and an HDMI cable transmitting a digital signal. These cables and signals, however, are examples only. The network I/F 105 inputs and outputs wired data 41 and wireless data 42.

A projection lens 38 may be a fixed-focus lens or a zoom lens and may have functions of such as a focal point distance, brightness, and an angle of view depending on the specification of the video output apparatus 11. An optical engine 37 projects video by, for example, a DLP method using a micro mirror. Besides the DLP method, there are, for example, a 3LCD method using a transmissive liquid crystal and an LCOS method using a reflective liquid crystal as a projection method of projecting a projection image. In the embodiments, any projection method may be used.

An optical engine control section 36 controls the optical engine 37 and, more specifically, controls the angle (direction) of a mirror piece of a Digital Mirror Device (DMV) in response to the rotational angle of a color wheel of the optical engine 37. When the color wheel generates R-color, G-color, or B-color light, the optical engine control section 36 controls the angle of the mirror piece in accordance with the R-color, G-color, or B-color image data, respectively.

A video signal input control section 32 reconstructs the image data transmitted as a video signal into video data in accordance with a transmission resolution. Namely, the video signal input control section 32 generates one frame of the image data. Further, the video signal input control section 32 includes functions to enhance the resolution by, for example, conversion from Interlace (I) to Progressive (P) and a density-doubling processing.

A network data processing section 35 performs a process in accordance with a communication protocol based on the communication data received by the network I/F 105 to acquire screen data per each frame. For example, the network data processing section 35 performs' a process of a protocol in TCP/IP (UDP/IP) and an application layer. There are some protocols in the application layer, which include, for example, but are not limited to in this embodiment, HTTP, FTP, and Simple Network Management Protocol (SNMP).

An image processing section 34 performs image processing on image data. As the image processing, there are a reducing image processing to fit to the resolution of the video projection apparatus and the Keystone correction processing, which are preferable to the video output apparatus 11 as described above. In addition, the image processing section 34 performs a general-purpose image processing such as y correction, shading correction, noise reduction, and edge reinforcement.

A power mode switching control section 31 switches a power mode of the video output apparatus 11. The video output apparatus 11 operates in a normal mode to project video and in a save energy mode where energy consumption amount is reduced. In the save energy mode, power supply to substrates and circuits in the substrates is stopped and the operation clock frequency is lowered. Upon detecting that, for example, a user does not operate the operation section 106 for a predetermined time period or image data are not received for a predetermined time period, the power mode switching control section 31 changes the power mode from the normal mode to the save energy mode. Further, upon detecting that, for example, a user operates the operation section 106 or image data are received, the power mode switching control section 31 changes the power mode from the save energy mode to the normal mode.

An input channel switching control section 33 switches the input channel for an image to be projected by the video output apparatus 11 automatically or based on a user's operation. The input channel refers to a channel to input a video signal of an RGB cable and a channel to input a video signal of an HDMI cable via the video cable I/F 107 and a channel to input the wired data 41 and a channel to input the wireless data 42 via the network IF 105.

Figure 4:
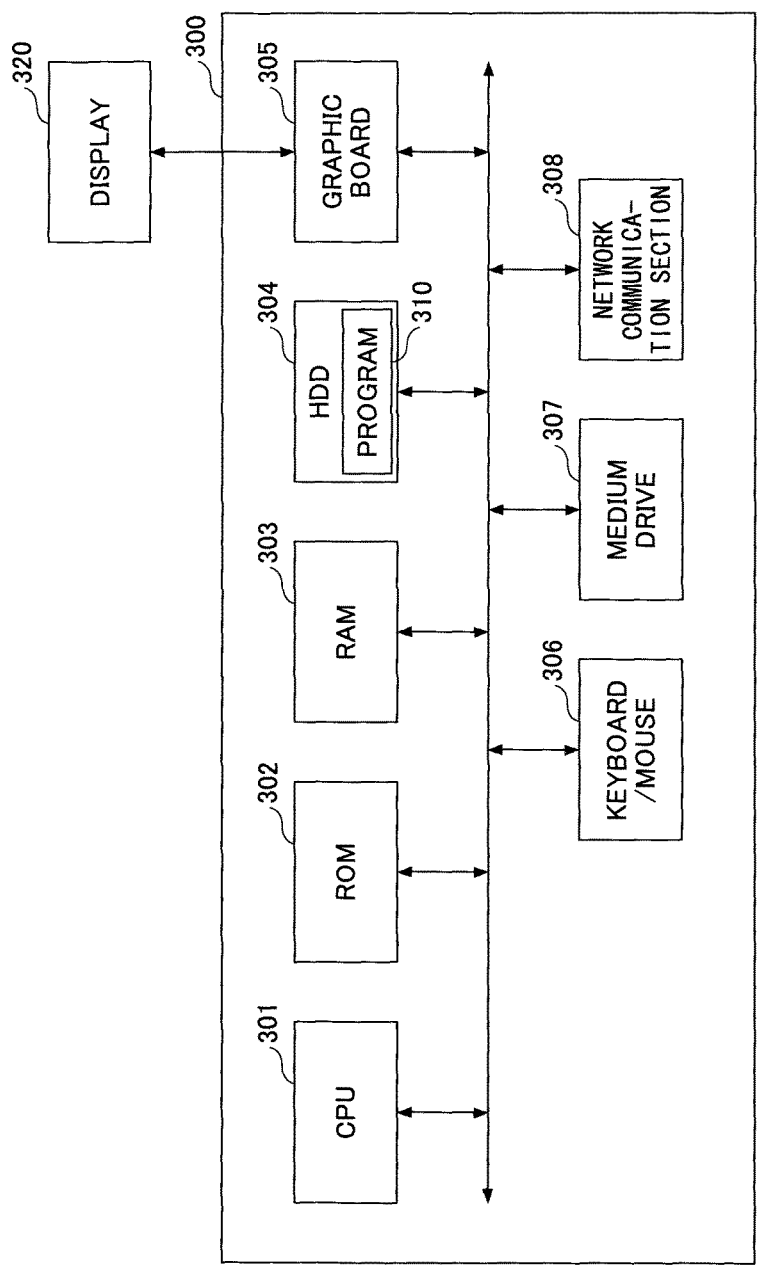
FIG. 4 illustrates an example hardware configuration of a client apparatus.

FIG. 4 illustrates an example hardware configuration of the client apparatus 21. The client apparatus 21 includes a CPU 301, a ROM 302, a RAM 303, an HDD 304, a graphic board 305 connected to a display 320, a keyboard/mouse 306, a medium drive 307, and a network communication section 308, which are connected with each other via a bus. The CPU 301 loads a program 310 stored in the HDD 304 into the RAM 303 and executes the program 310 to control each part to input and output data and perform data processing. The ROM 302 stores a start program to read a BIOS and an OS to load them in the RAM 203.

The HDD 304 is a non-volatile memory such as, for example, a Solid State Drive (SSD). The HDD 304 stores a device driver and a program 310 that provides functions described below. As the OS, there are, for example, Window (registered trademark) based OSs, LINUX (registered trademark), UNIX (registered trademark), Android (registered trademark), MAC X (registered trademark), and iOS (registered trademark). The display 320 displays a GUI screen which is based on program instructions and generated by the graphic board 305.

The keyboard/mouse 306 is an input device to accept a user's operation. The medium drive 307 reads and writes data from and to an optical medium such as a compact disc, a DVD, and a Blu-ray (registered trademark) disc. The medium drive 307 may read and write data from and to a memory card such as a flash memory.

The network communication section 308 may be, for example, the Ethernet (registered trademark) to be connected to, for example, a LAN. The processes of protocol in TCP/IP (UDP/IP) and the application layer are performed by the OS or the program 310. At least the protocol of the application layer corresponds to the protocol that the video output apparatus 11 has.

The program 310 is recorded and distributed in a computer-readable recording medium in an installable and executable file format. Further, the program 310 as a file in an installable format and an executable format is distributed from a server (not shown).

Figure 5:
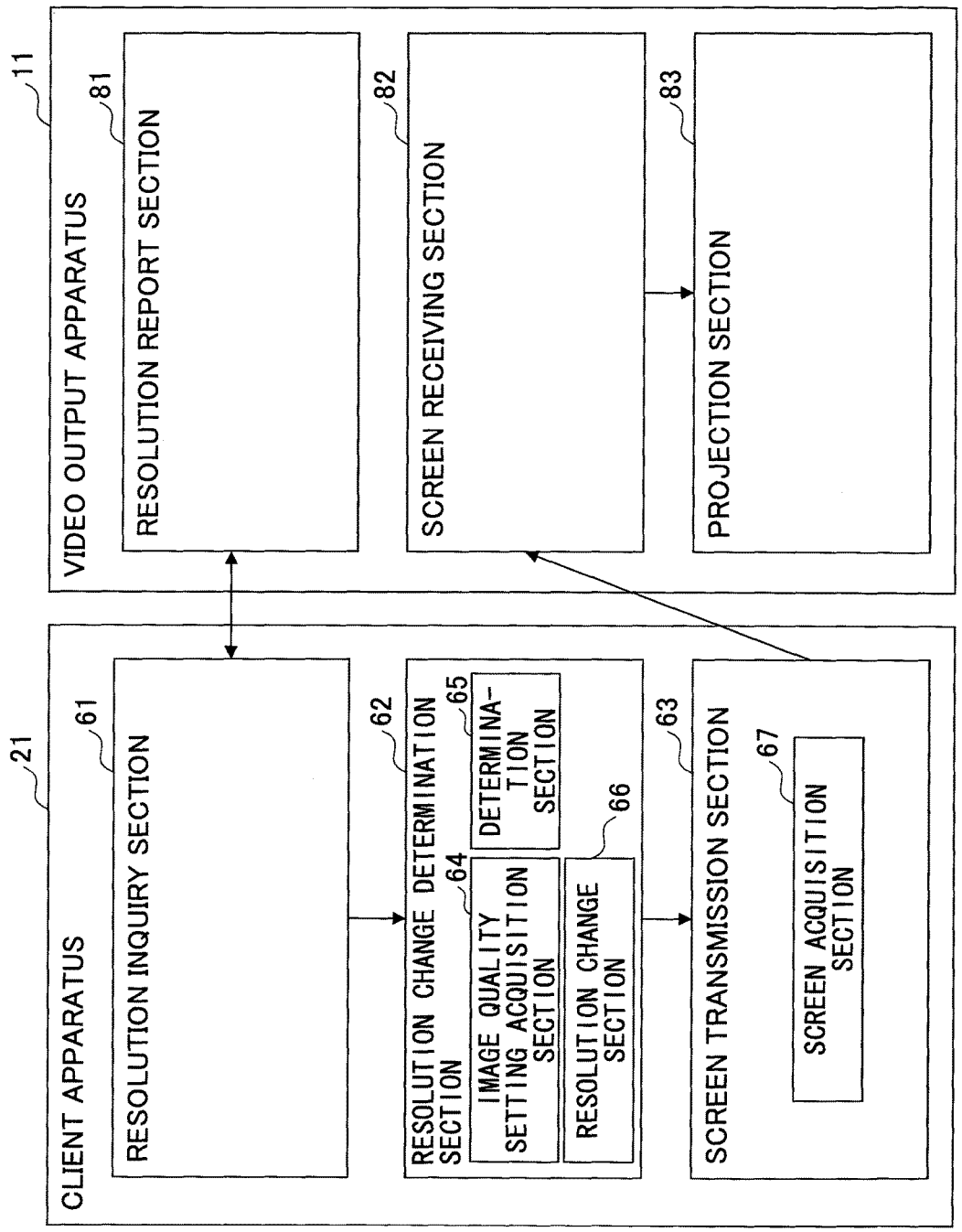
FIG. 5 illustrates an example block diagram of the video output system.

FIG. 5 is an example block diagram of a video output system 100. The functions of the client apparatus 21 are provided based on an application (a part of the program 310) that has been developed as a tool or utility of the video output apparatus 11. Those functions are realized when the CPU 301 executes the application, so that the client apparatus 21 can communicate with the video output apparatus 11 to transmit screen data and a user can wirelessly perform settings and operations.

A resolution inquiry section 61 acquires the resolution of the video output apparatus 11 based on a communication with the video output apparatus 11. The resolution inquiry section 61 transmits the acquired resolution (maximum resolution based on specification) to a resolution change determination section 62.

The resolution change determination section 62 determines whether it is necessary to change the resolution of the client apparatus 21 based on the resolution acquired by the resolution inquiry section 61, the screen resolution of the client apparatus 21, and an image quality setting set by a user. When determining necessary, the resolution change determination section 62 changes the screen resolution of the client apparatus 21. After that, the resolution change determination section 62 notifies a screen transmission section 63 that the screen transmission is ready. The resolution change determination section 62 includes an image quality setting acquisition section 64 to acquire the image quality setting set by a user, a determination section 65 to determine whether it is necessary to change the screen resolution of the client apparatus 21, and a resolution change section 66 to change the screen resolution of the client apparatus 21.

The screen resolution of the client apparatus 21 is based on the resolution of the screen generated by the graphic board 305, so as to be changed within a specification range of the graphic board 305. Hereinafter, the screen resolution of the client apparatus 21 may be referred to as a "resolution of the client apparatus (21)". Further, the resolution change section 66 changes the screen resolution by sending a request to the OS.

The screen transmission section 63 acquires the screen data of the screen of the client apparatus 21, adjusts the format of the screen data so as to be transmitted via a network by, for example, adding a header, and transmits the adjusted screen data to the video output apparatus 11. The screen transmission section 63 includes a screen acquisition section 67 to acquire screen data. The screen acquisition section 67 acquires (captures) the screen data using a clipboard or an API of the OS. If an icon of the mouse is not acquired into the screen data, the data indicating the position of the mouse and the image data of the mouse are acquired from the OS to be combined in the screen data. By doing this, the screen data including the mouse is obtained. The screen acquisition section 67 encodes the screen data into, for example, a JPEG image.

In response to the inquiry of the resolution from the client apparatus 11, a resolution report section 81 of the video output apparatus 11 reports the resolution of the video output apparatus 11 (the maximum resolution in the specification) to the client apparatus 11. The resolution report section 81 is included in the network data processing section 35 of FIG. 3.

A screen receiving section 82 receives the screen data transmitted from the client apparatus 21, and transmits the screen data to a projection section 83. The screen receiving section 82 is included in the image processing section 34 of FIG. 3.

The projection section 83 converts the screen data in a format to be transmitted via a network into data for projection, and controls the optical engine 37. For example, the projection section 83 separates the screen data into each color component (RGB), and converts each color of the screen data into data to control the DVD. The projection section 83 is included in the optical engine control section 36.

FIG. 6 illustrates example operations of the client apparatus 21 corresponding to the resolution of the video output apparatus 11 and the resolution of the client apparatus 21. When the resolution of the video output apparatus 11 is XGA (1024×768) and the current resolution of the client apparatus 21 is WXGA (1280×800), the client apparatus 21 sets the resolution of the client apparatus 21 to be equal to the resolution of the video output apparatus 11.

When the resolution of the video output apparatus 11 is WXGA (1280×800) and the current resolution of the client apparatus 21 is WXGA (1280×800), the client apparatus 21 does not do anything about the resolution change.

Further, the resolution of the client apparatus 21 after the resolution change may be lower than the resolution of the video output apparatus 11. By lowering the resolution of the client apparatus 21, it becomes possible to reduce the processing load of the client apparatus 21.

Figure 7A:
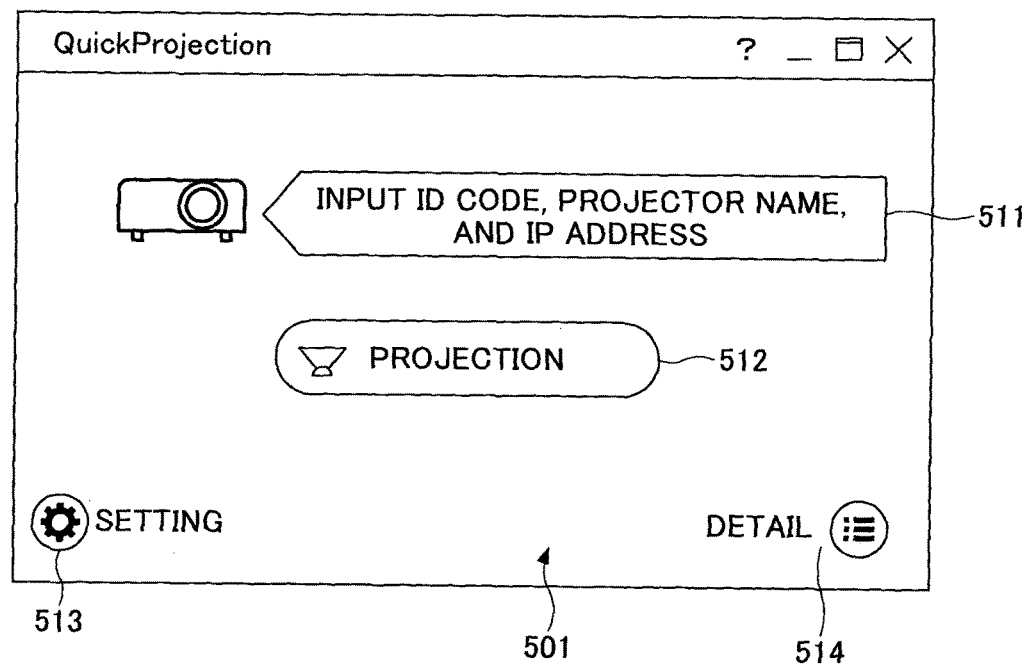
FIGS. 7A and 7B illustrate examples of application screens displayed on the display of the client apparatus.
Figure 7B:
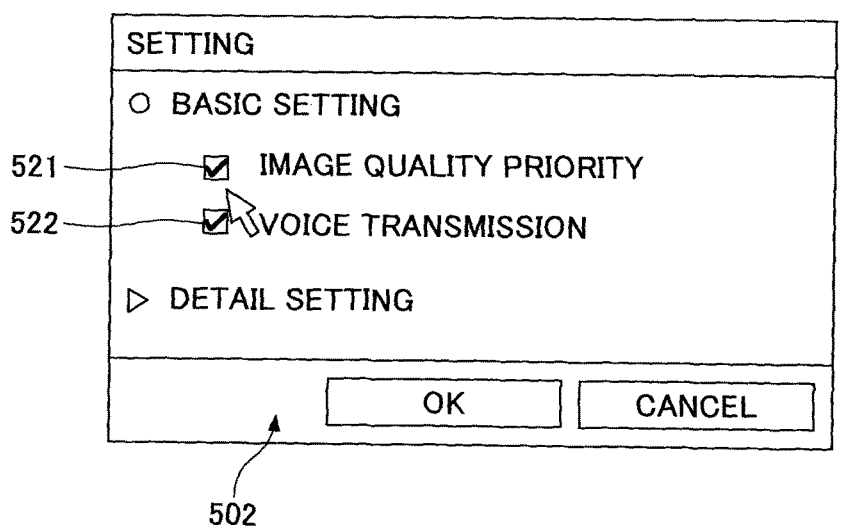

FIGS. 7A and 7B illustrate example screens displayed on the display 320 of the client apparatus 21. FIG. 7A illustrates a projection start screen 501. The projection start screen 501 includes a projector designating column 511, a projection button 512, a setting button 513, and a detail button 514. In the projector designating column 511, a user designates a video output apparatus to which the screen data of the client apparatus 21 are to be transmitted. A user may designate the video output apparatus by using, for example, an identification code, a projector name, or an IP address.

The projection button 512 is used to accept the start of the transmission of the screen data from a user. The setting button 513 is used to accept an instruction to display the setting screen of FIG. 7B. The detail button 514 is used to accept tan instruction to display a detail setting of the video output apparatus 11.

FIG. 7B illustrates a setting screen 502. The setting screen 502 is used to accept a basic setting and a detail setting. As the basic setting, there are an image quality priority box 521 (an example of claimed quality setting) which accepts a setting whether priority is placed on image quality and a voice transmission box 522 which accepts a setting whether voice data are transmitted. When a user checks (turns ON) the image quality priority box 521, the client apparatus 21 transmits the screen data based on the current resolution of the client apparatus 21. When a user does not check (turns OFF) the image quality priority box 521, the client apparatus 21 lowers the resolution of the screen data so that the lowered resolution is lower than or equal to the resolution of the video output apparatus 11 and then transmits the screen data. Namely, the image quality priority box 521 accepts the setting whether to permit the lowering of the image quality of the screen data to be transmitted to the video output apparatus 11.

The voice transmission box 522 accepts a setting whether voice data are transmitted. When the voice transmission box 522 is checked, the client apparatus 21 transmits voice data to the video output apparatus 11, so that voice is output from the client apparatus 21.

When the image quality priority box 521 is checked, the image quality setting acquisition section 64 sets an image quality priority flag and stores the flag. Further, when the check of the image quality priority flag is removed, the image quality setting acquisition section 64 clears the image quality priority flag. Therefore, it becomes possible to know whether a priority is to be placed on the image quality by referring to the image quality priority flag.

The detail setting in the setting screen 502 is an acceptance button to open a detail setting screen where, for example, a scaling magnification of a projected image can be set.

Figure 8:
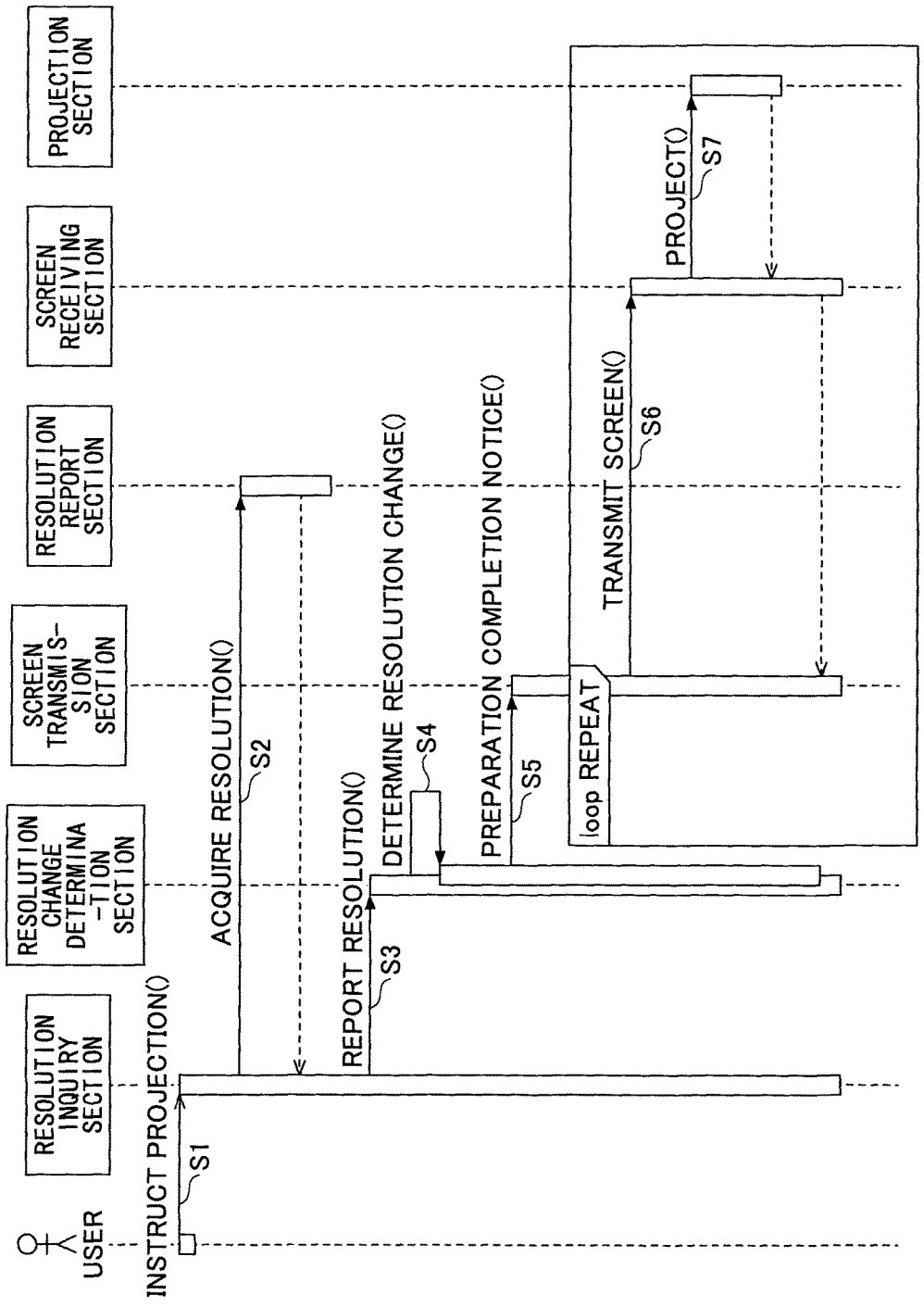
FIG. 8 is an example sequence diagram of an operational procedure of the client apparatus and the video output apparatus.

FIG. 8 is an example sequence diagram of a sequence of an operational procedure of the client apparatus 21 and the video output apparatus 11.

Step S1: A user presses the projection button 512.

Step S2: When the user presses the projection button 512, the client apparatus 21 transmits screen data. Therefore, the resolution inquiry section 61 inquires about the resolution from the resolution report section 81.

Step S3: The resolution inquiry section 61 notifies the resolution change determination section 62 of the resolution.

Step S4: The resolution change determination section 62 determines whether it is necessary to change the resolution. The process in step S4 is described below.

Step S5: The resolution change determination section 62 sends a preparation completion notice to the screen transmission section 63.

Step S6: The screen transmission section 63 acquires screen data and transmits the screen data to the screen receiving section 82.

Step S7: The projection section 83 of the video output apparatus 11 projects the screen data from the optical engine 37.

Figure 9:
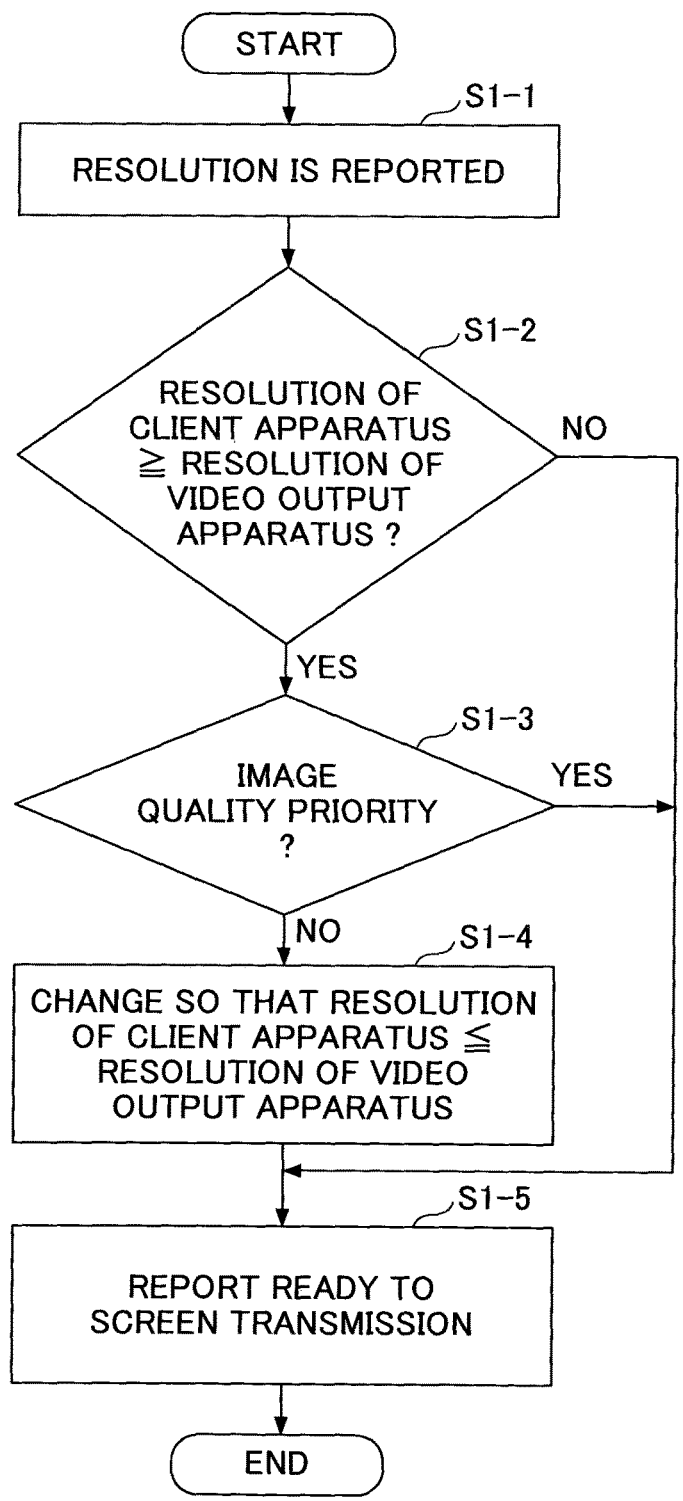
FIG. 9 is an example flowchart of a procedure for determining whether it is necessary for a resolution change determination section to change the resolution.

FIG. 9 is an example flowchart of a procedure of determining whether it is necessary for the resolution change determination section 62 to change the resolution in step S4 of FIG. 8.

The resolution of the video output apparatus 11 is reported to the resolution change determination section 62 (step S1-1).

The determination section 65 determines whether the resolution of the client apparatus 21 is higher than the resolution of the video output apparatus 11 (step S1-2). The determination section 65 acquires the current resolution of the client apparatus 21 from, for example, the OS. This resolution refers to the resolution of the display when the resolution of the display is the same as that of the graphic board 305. Otherwise, that is, when the resolution of the display is different from that of the graphic board 305, this resolution refers to the resolution of screen currently generated by the graphic board 305.

When the resolution of the client apparatus 21 is not higher than the resolution of the video output apparatus 11 (NO is step S1-2), it may not be necessary to lower the resolution any more. Therefore, the resolution change determination section 62 transmits the preparation completion notice of the screen data transmission to the screen transmission section 63 (step S1-5).

When the resolution of the client apparatus 21 is higher than the resolution of the video output apparatus 11 (YES in step S1-2), the determination section 65 refers to the image quality priority flag to determine whether the image quality priority is set in the client apparatus 21 (step S1-3).

When determining that the image quality priority is set (YES in step S1-3), the resolution should not be lowered. Therefore, the resolution change determination section 62 transmits the preparation completion notice of the screen data transmission to the screen transmission section 63 (step S1-5).

When determining that the image quality priority is not set (NO in step S1-3), it is possible to lower the resolution. Therefore, the resolution change section 66 changes the resolution of the client apparatus 21 (step S1-4). Namely, the resolution change section 66 changes the resolution by, for example, designating the resolution of the video output apparatus 11 to the OS. The resolution change section 66 stores the resolution before the change is made so as to restore the resolution before the change is made.

The resolution after the change is maintained until a user checks the image quality priority box 521. Further, when a user changes the resolution by directly using a user interface (UI) of the OS, the application restores the original resolution. By doing this, the operability may be improved because it is not necessary for a user to restore the resolution.

As described above, in a video projection system according to this embodiment, the resolution of the client apparatus 21 is lowered only when the image quality priority box 521 is not checked. Therefore, the resolution can be changed only when a user permits. Therefore, it becomes possible to reduce the delay phenomenon without bothering a user.

Further, this embodiment does not limit the scope of the present invention. In this regard, the video output apparatus may inquire about the resolution from the client apparatus, and when the resolution of the client apparatus is higher than that of the video output apparatus, a request to change the resolution may be sent. Further, the video output apparatus may have a button to accept the image quality priority, so that a result of the user's operation may be sent to the client apparatus. Further, the number of the client apparatus is more than one, and any of the client apparatuses may have such a function.

Second Embodiment

In this embodiment, a client apparatus 21 is described that changes the screen resolution of the client apparatus 21 based on the specification of the client apparatus 21. By doing this, even in a case where a user checks the image quality priority box 521, if the client apparatus 21 having a lower specification (resolution) is used, the resolution of the client apparatus 21 is changed. Therefore, it becomes possible to reduce the delay phenomenon without increasing the load of the video output apparatus 11.

Further, in this embodiment, the elements having the same reference numerals as those in the first embodiment have the similar functions as those in the first embodiment. Therefore, only main elements in this embodiment may be described.

Figure 10:
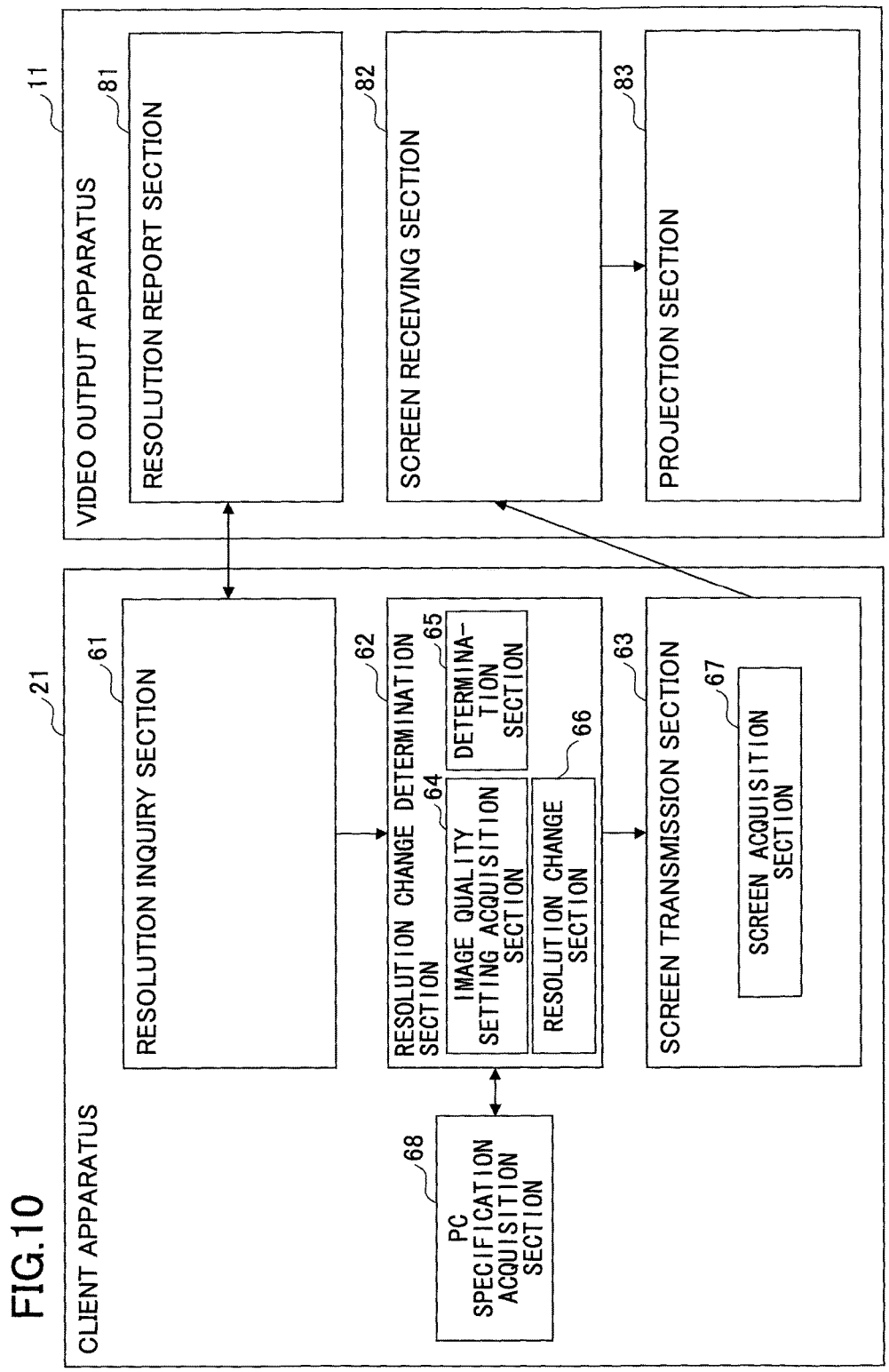
FIG. 10 illustrates an example block diagram of a video output system (second embodiment)

FIG. 10 is an example block diagram of a video output system 100. Unlike the first embodiment, the client apparatus 21 includes a PC specification acquisition section 68. The PC specification acquisition section 68 acquires the specifications of the client apparatus 21. For example, the PC specification acquisition section 68 acquires, for example, a CPU name, an operation clock, a physical memory capacity, data transfer rate on the motherboard, and wireless data transfer rate. These data are managed by the OS, so the PC specification acquisition section 68 may inquire about the data (specifications) from the OS. The PC specification acquisition section 68 transmits the specifications to the resolution change determination section 62.

Then, if the specification value is less than a threshold value, the resolution change determination section 62 changes the resolution of the client apparatus 21 to be lower than or equal to the resolution of the video output apparatus 11.

FIG. 11A illustrates an example list of criteria whether the resolution change determination section 62 is to determine to change the resolution of the client apparatus 21. In this criteria list, the minimum specifications of the CPU criteria and the memory criteria are registered. For example, the CPU criteria refer to the CPU specifications including a CPU manufacturer name, a model number, and the operating clock. The memory criteria refer to a physical memory capacity. Regarding the CPU criteria, if all the acquired specifications are lower than those in the criteria list (CPU criteria), the resolution change determination section 62 determines that the specification of the client apparatus 21 is low. Regarding the memory criteria, if the acquired physical memory capacity is less than that in the criteria list (Memory criteria), the resolution change determination section 62 determines that the specification of the client apparatus 21 is low. In this case, for the purpose of the determination based on the CPU criteria, the resolution change determination section 62 has a table including a release date corresponding to the CPU manufacturer name and the model number.

FIG. 11B illustrates an example operations of the client apparatus 21 corresponding to the specific CPU specification and the physical memory capacity. If, for example, the CPU specification is "Intel Core 2Duo 1.8 GHz (registered trademark)" and the physical memory capacity is "2 GByte", the specifications are determined to be lower than the specifications of the criteria list. Therefore, the resolution change determination section 62 changes the resolution of the client apparatus 21 to be equal to the resolution of the video output apparatus 11. On the other hand, if, for example, the CPU specification is "Intel Core i5 1.6 GHz (registered trademark)" and the physical memory capacity is "4 GByte", the specifications are determined to be higher than or equal to the specifications of the criteria list. Therefore, the resolution change determination section 62 does not do anything about the resolution (i.e., does not change the resolution).

FIG. 12 illustrates an example sequence diagram of an operational sequence of the client apparatus 21 and the video output apparatus 11. In the following, steps different from the steps in the first embodiment are described.

Step S3: The resolution inquiry section 61 reports the resolution to the resolution change determination section 62.
Step S3-1: The resolution change determination section 62 sends a request to the PC specification acquisition section 68 to acquire the specifications. The PC specification acquisition section 68 acquires the specifications from the OS and transmits the specifications to the resolution change determination section 62.
Step S4: The resolution change determination section 62 determines whether it is necessary to change the resolution. The process in step S4 is described below.
Step S5: The resolution change determination section 62 sends the preparation completion notice to the screen transmission section 63. After that, processes are similar to those in the first embodiment.

Figure 13:
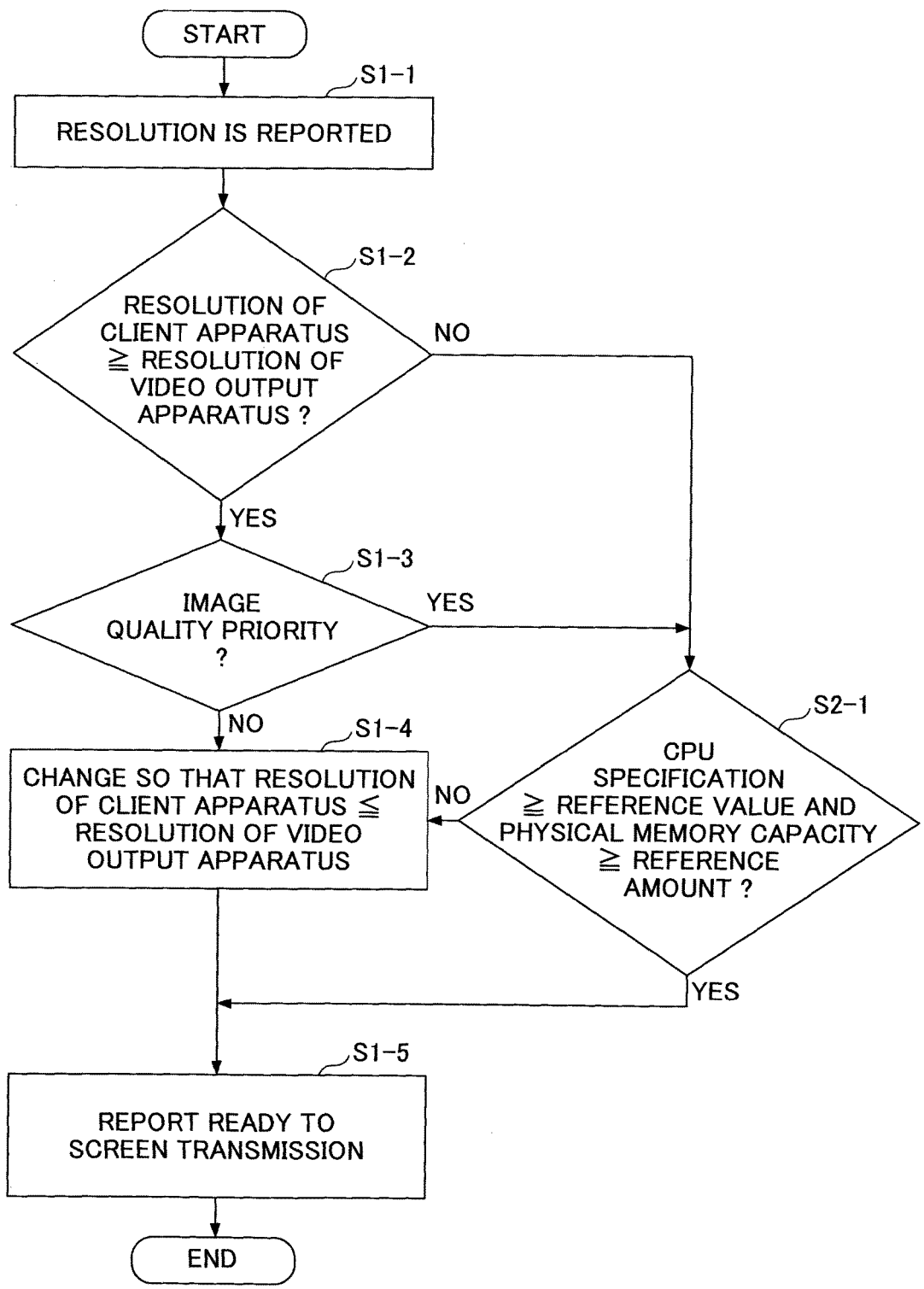
FIG. 13 is an example flowchart of a procedure for determining whether it is necessary for the resolution change determination section to change the resolution (second embodiment)

FIG. 13 is an example flowchart of a procedure to determine whether it is necessary for the resolution change determination section 62 to change the resolution. In comparison with FIG. 9, step S2-1 is added.

The resolution change determination section 62 determines whether the CPU specification is higher than that described in the criteria and the physical memory capacity is greater than that descried in the criteria (step S2-1).

When determining that the CPU specification is not higher than that described in the criteria or the physical memory capacity is not greater than that descried in the criteria (NO in step S2-1), the resolution change determination section 62 changes the resolution of the client apparatus 21 (step S1-4).

When determining that the CPU specification is higher than that described in the criteria and the physical memory capacity is greater than that descried in the criteria (YES in step S2-1), the resolution change determination section 62 does not change the resolution of the client apparatus 21.

Namely, in a case where the processing ability is low, even when a user checks the image quality priority box 521, the resolution of the client apparatus 21 is set to be lower than that in the current setting. The resolution is changed when a user uses the client apparatus 21 having a lower specification, so that the client apparatus 21 may transmit screen data without delay. Therefore, it becomes possible to reduce the delay phenomenon without increasing the load on the video output apparatus 11.

Third Embodiment

In the first embodiment, the client apparatus 21 changes the resolution of the client apparatus 21 based on the resolution of the video output apparatus 11. In this embodiment, a video output system 100 is described where client apparatus 21 changes a range of the screen data to be acquired based on the resolution of the video output apparatus 11. By doing this, the delay phenomenon may be reduced without changing the resolution of the client apparatus 21.

Figure 14:
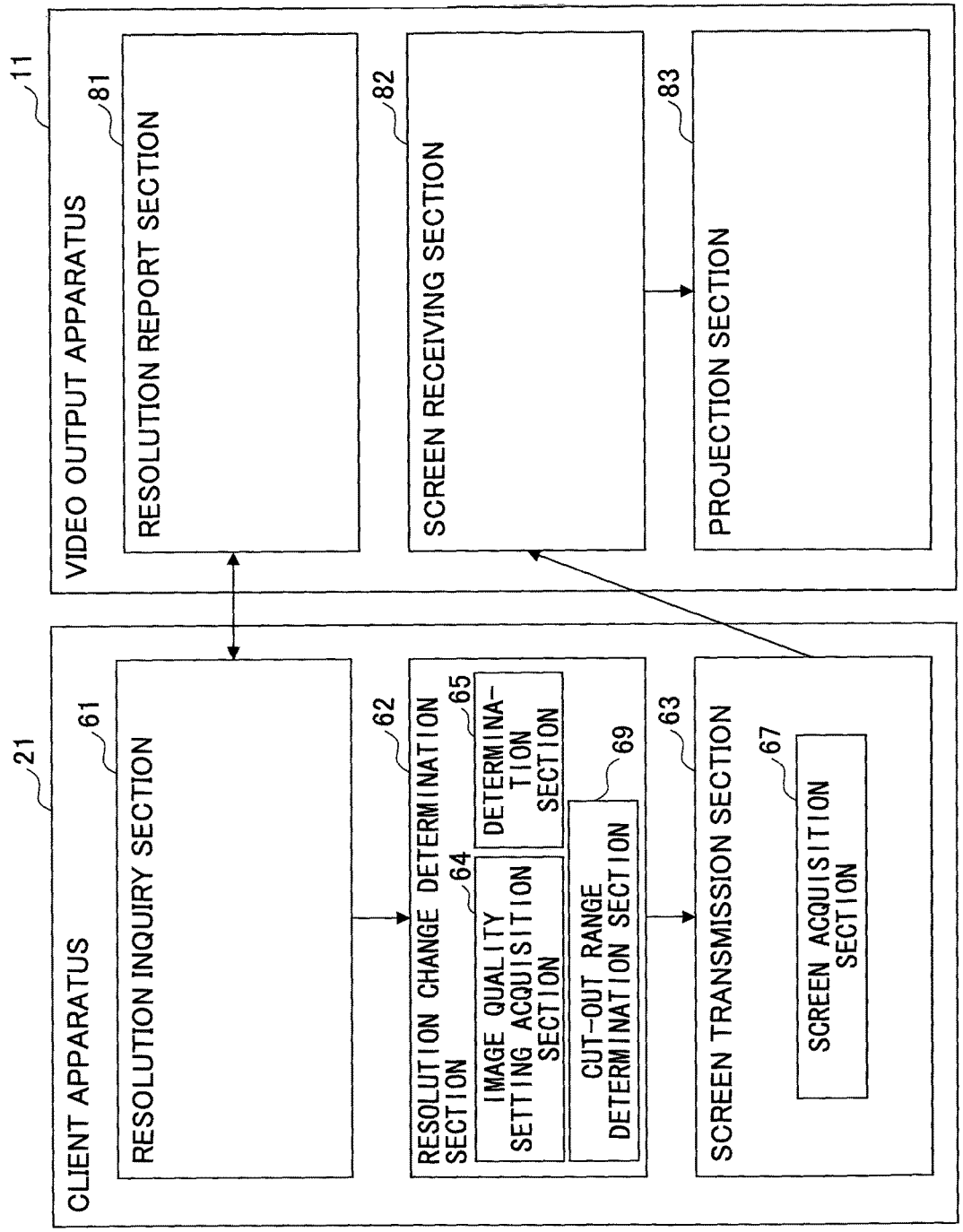
FIG. 14 illustrates an example block diagram of the video output system (third embodiment)

FIG. 14 is an example block diagram of a video output system 100. The client apparatus 21 includes a cut-out range determination section 69 in place of the resolution change section 66 in the first embodiment. The cut-out range determination section 69 determines a cut-out range of the screen data to be acquired by the screen acquisition section 67. Specifically, the cut-out range determination section 69 determines a cut-out range which is less than or equal to the resolution of the video output apparatus 11. The screen acquisition section 67 acquires the screen data based on the determined range.

Figure 15A:
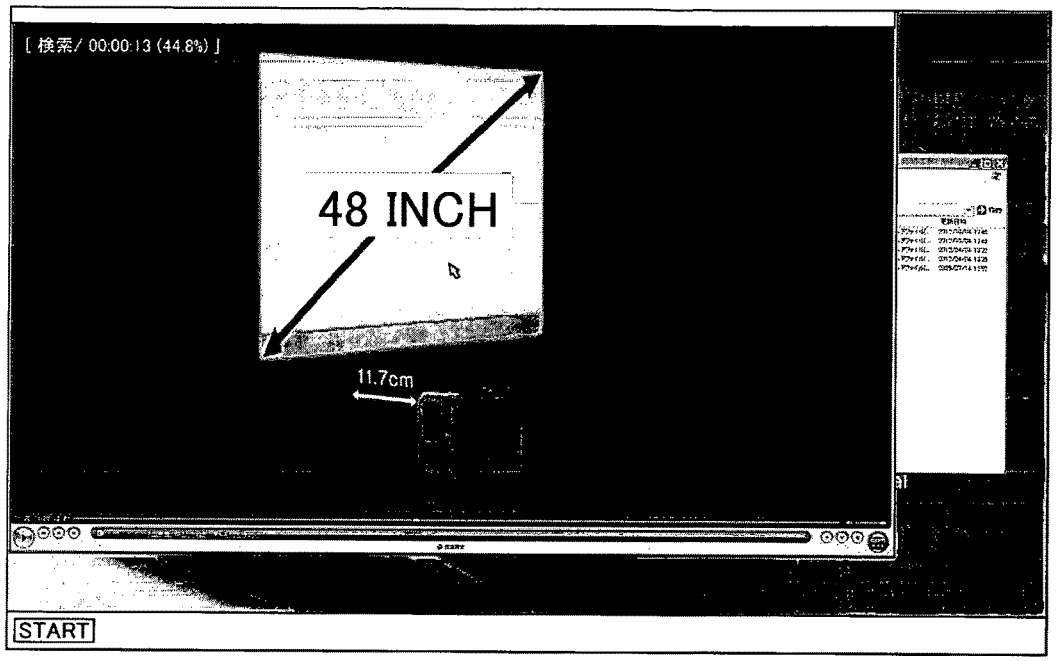
FIGS. 15A and 15B schematically illustrate an example determination method of determining a cut-out range.
Figure 15B:
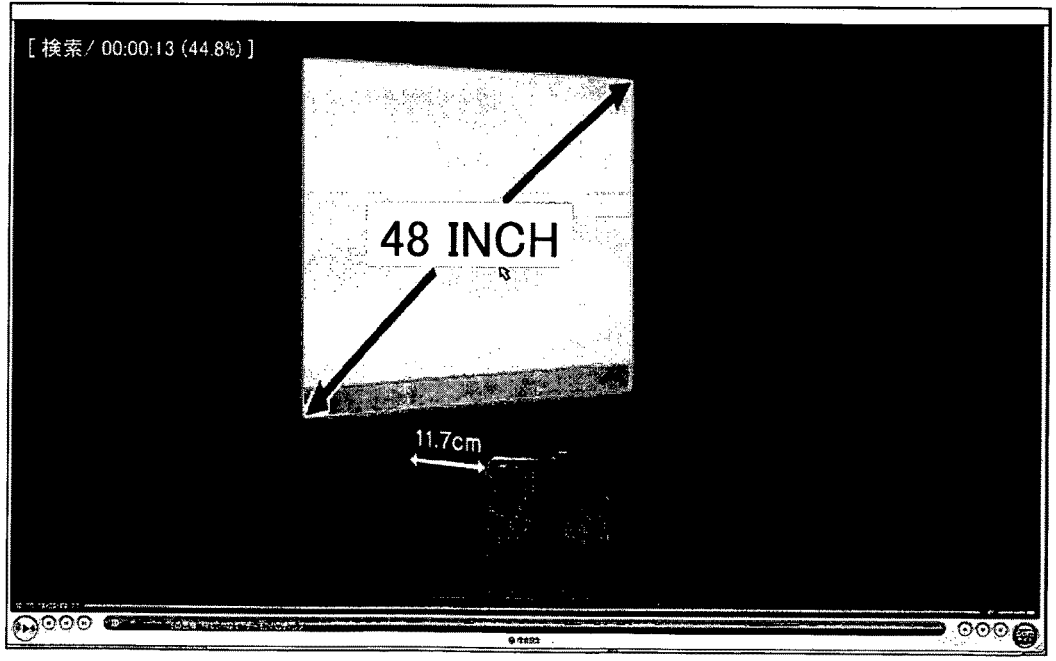

FIGS. 15A and 15B schematically illustrate an example how the cut-out range is determined. FIG. 15A indicates the screen data displayed on the display 320 of the client apparatus 21. The resolution of the screen data is 1440×900. When the resolution of the video output apparatus 11 is 1024×768, the resolution of the client apparatus 21 is higher. Therefore, the determination section 65 sends a request to the cut-out range determination section 69 to determine the cut-out range.

It is desired that the cut-out range corresponds to a range where a user pays attention. To that end, the cut-out range determination section 69 determines the range that has a 1024×768 size with the position pointed to by the mouse (mouse position) as the center, as the cut-out range. The mouse position may be acquired by querying the OS. When the mouse position is described as (X,Y), the cut-out range is given as follows:
X direction: X−512 to X+512
Y direction: Y−384 to Y+384

FIG. 153 illustrates the screen data that is acquired by the screen acquisition section 67. The screen data of the cut-out range determined by the cut-out range determination section 69 are included.

If the mouse position is near the edge of the display 320, the cut-out range is determined in a manner that in the horizontal direction, 1024 pixels from the left or right edge, whichever is closer to the mouse position, are cut out and in the vertical direction, 768 pixels from upper or lower edge, whichever is closer to the mouse position, are cut out to form the cut-out range.

Figure 16A:
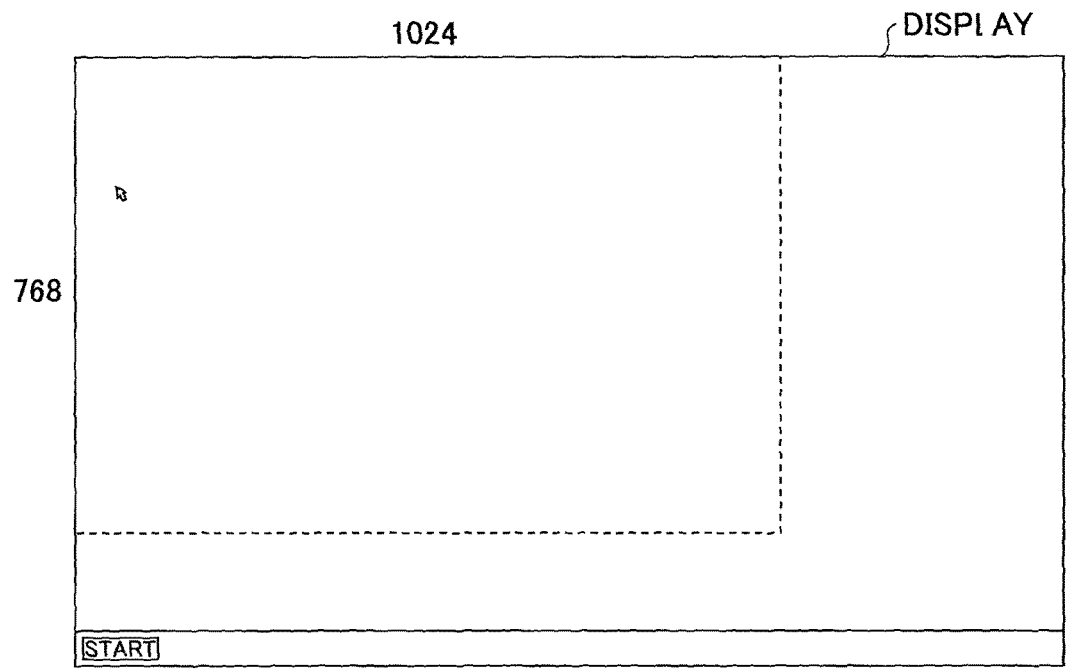
FIGS. 16A and 16B schematically illustrate an example determination method of determining a cut-out range.
Figure 16B:
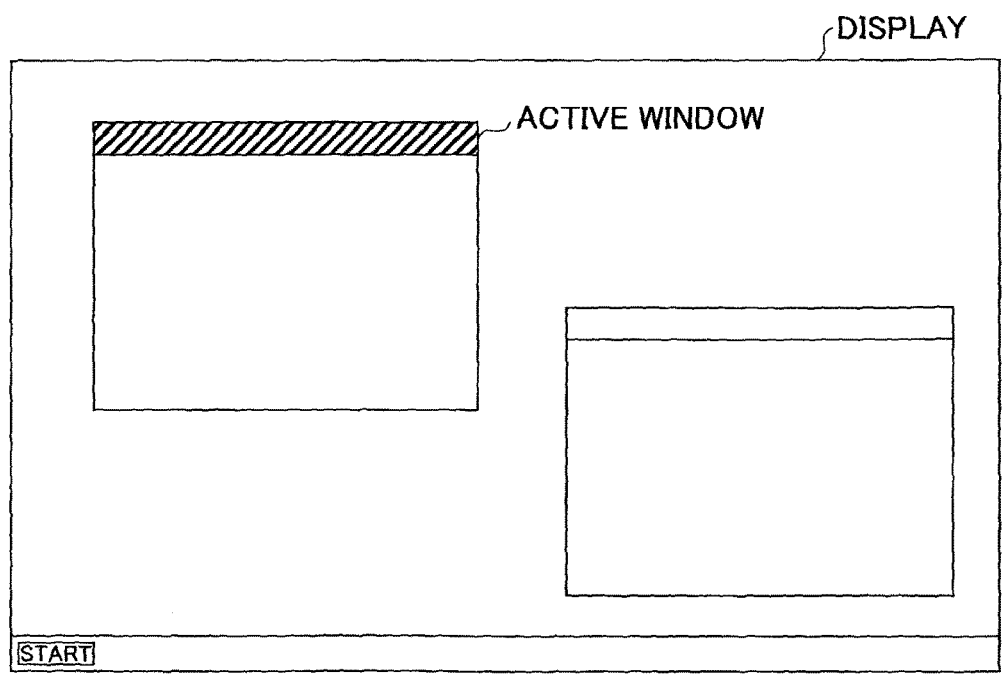

Further, as illustrated in FIG. 16B, regardless of the mouse position, the screen data of a predetermined active window may alternatively be acquired. Here, the active window refers to a window (area) which is set to be a target of the user's operation. The active window may be identified by querying the OS. When the size of the active window is greater than the resolution, the screen data having a 1024× 768 size with the center position of the active window as the center as the cut-out range may be cut out. When the size of the active window is less than the resolution, the screen data having a 1024×768 size exceeding the active window size with the center position of the active window as the center as the cut-out range may be cut out.

Figure 17:
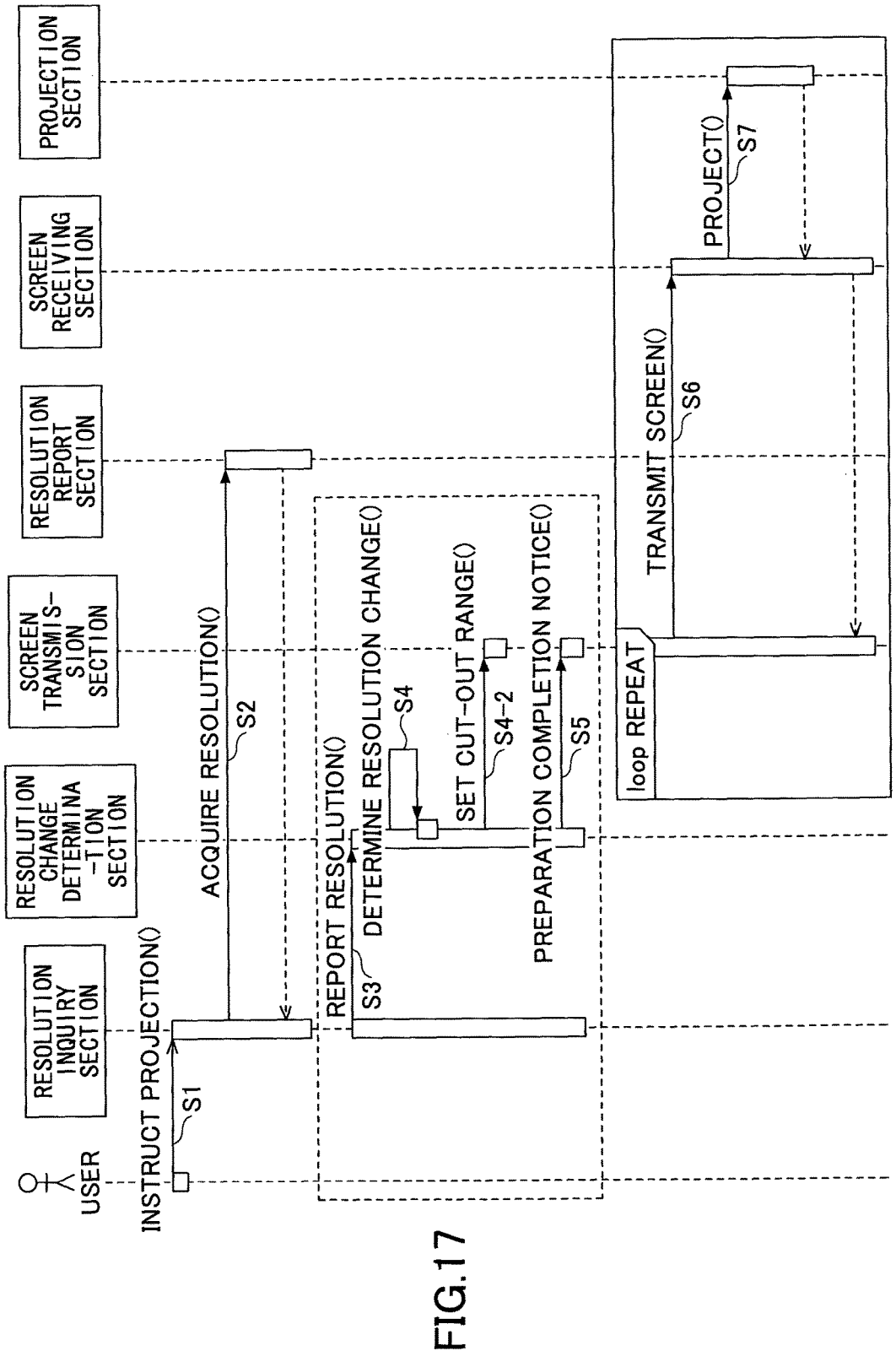
FIG. 17 is an example sequence diagram of an operational procedure of the client apparatus and the video output apparatus (third embodiment)

FIG. 17 is an example sequence diagram of an operational procedure of the client apparatus 21 and the video output apparatus 11. In the following, steps different from those in the first embodiment are described.

Step S3: The resolution inquiry section 61 reports the resolution to the resolution change determination section 62.

Step S4: The resolution change determination section 62 determines whether it is necessary to change the resolution. The process in step S4 is described below.

Step S4-1: The cut-out range determination section 69 of the resolution change determination section 62 determines the cut-out range.

Step S4-2: The cut-out range determination section 69 sets the cut-out range in the screen transmission section 63.

Step S5: The resolution change determination section 62 sends the preparation completion notice to the screen transmission section 63. After that, processes are similar to those in the first embodiment.

Figure 18:
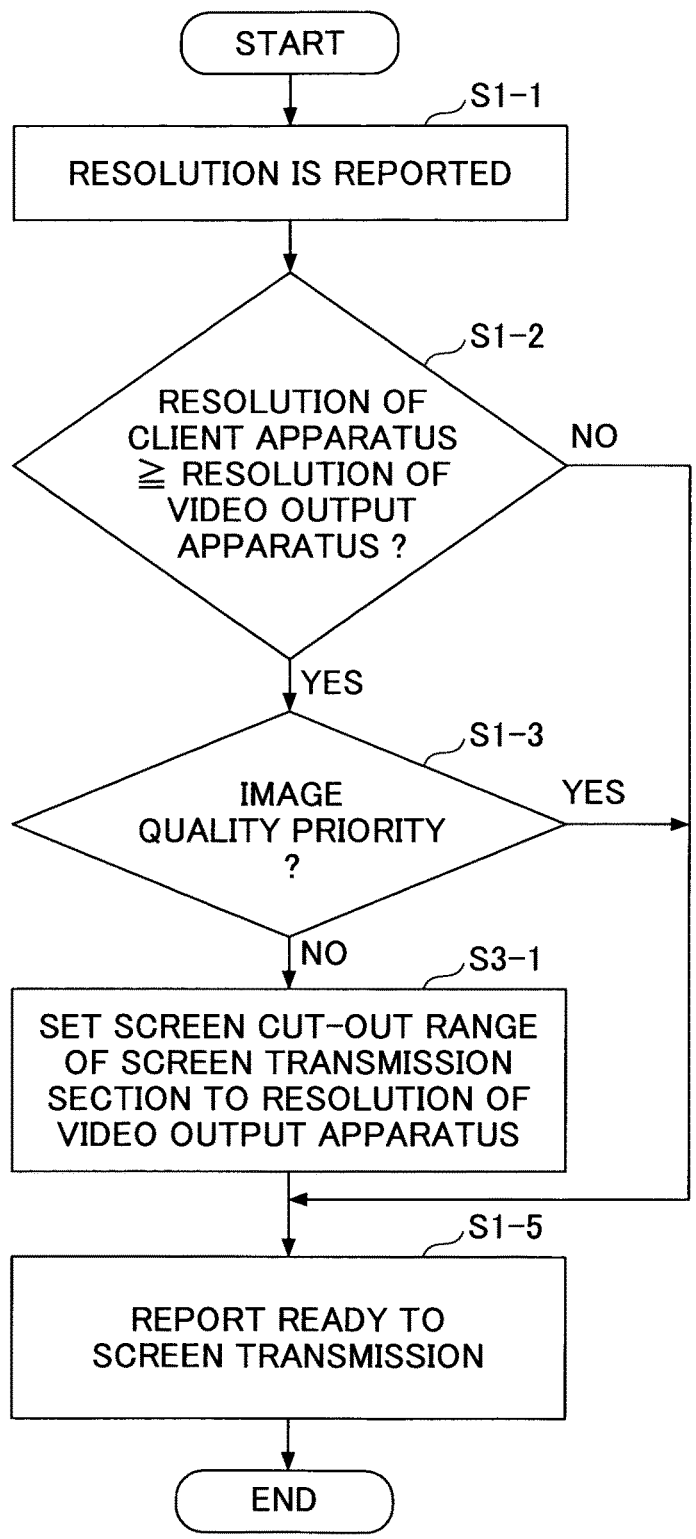
FIG. 18 is an example flowchart of a procedure for determining whether it is necessary for the resolution change determination section to change the resolution (third embodiment)

FIG. 18 is an example flowchart of a procedure in which the resolution change determination section 62 determines whether it is necessary to change the resolution. In the procedure, the step S1-4 in FIG. 9 has been replaced by step S3-1.

In step S1-3, when the image quality priority is not set (NO in step S1-3), the cut-out range determination section 69 sets the cut-out range in the screen transmission section 63 (step S3-1). By doing this, the resolution of the screen data to be transmitted to the video output apparatus 11 is set to be equal to the resolution of the video output apparatus 11. Therefore, it becomes possible to prevent the increase of the processing load of the video output apparatus 11.

According to this embodiment, by changing a range of the screen data acquired by the client apparatus in accordance with the resolution of the video output apparatus, it becomes possible to reduce the delay phenomenon without changing the resolution.

Fourth Embodiment

In this embodiment, a video output system 100 is described where the resolution of the client apparatus 21 is changed based on a change amount of the screen of the client apparatus 21. When the change amount of the screen of the client apparatus 21 is so large that the load is increased, the resolution is changed to prevent (reduce) the transmission delay. By doing this, it becomes possible to control the delay phenomenon without increasing the load on the video output apparatus 11.

Figure 19:
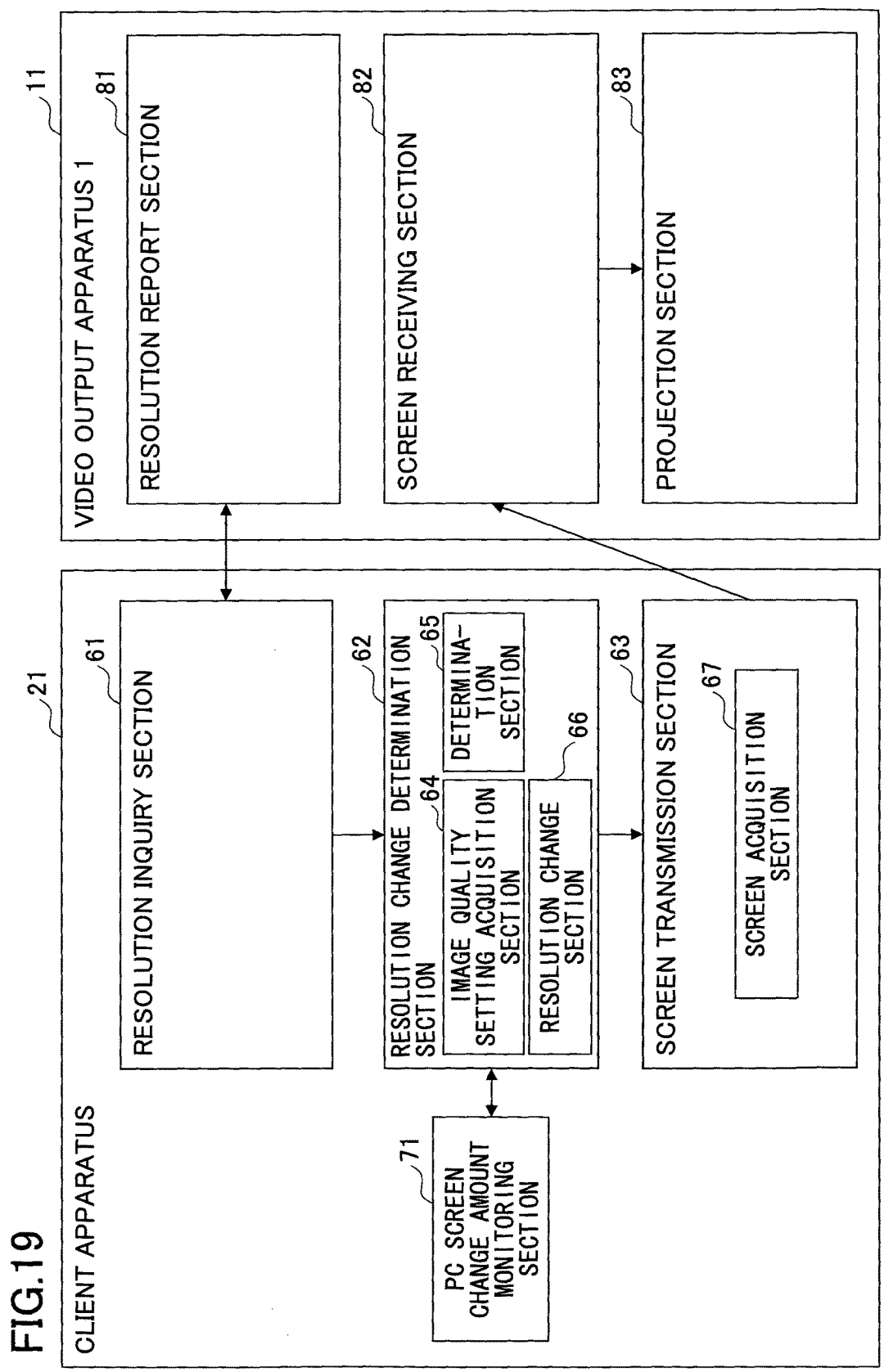
FIG. 19 illustrates an example block diagram of the video output system (fourth embodiment)

FIG. 19 is an example block diagram of a video output system 100. The client apparatus 21 further includes a PC screen change amount monitoring section 71. The PC screen change amount monitoring section 71 compares the screen change amount of the client apparatus 21 with a reference value and determines whether the change amount is large or small.

Figure 20A:
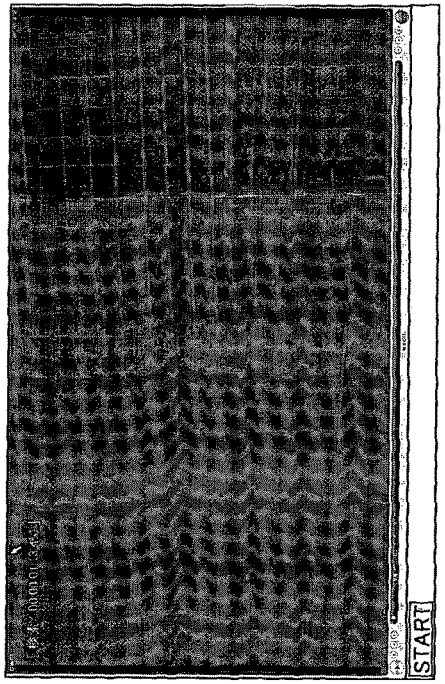
FIGS. 20A through 20D schematically illustrate a calculation method of calculating a screen change amount.
Figure 20C:
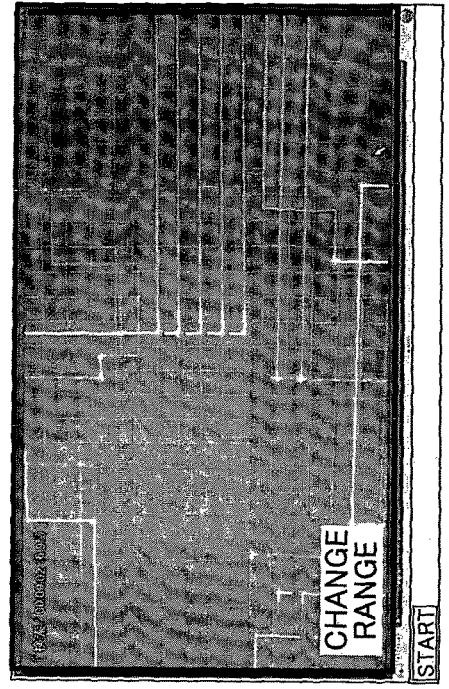
Figure 20B:
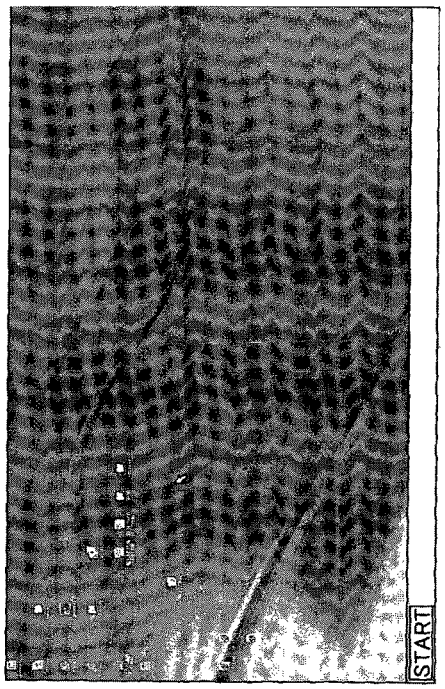

FIGS. 20A and 20B illustrate an example of the screen change amount. As is apparent from a comparison between FIGS. 20A and 20B, the change (difference) is that only the mouse position is moved. In this case, the screen change amount refers to a rectangular area of which a diagonal line is a line connected between the mouse position before the movement and the mouse position after the movement. The PC screen change amount monitoring section 71 calculates the screen change amount based on a method described below.

Figure 20D:
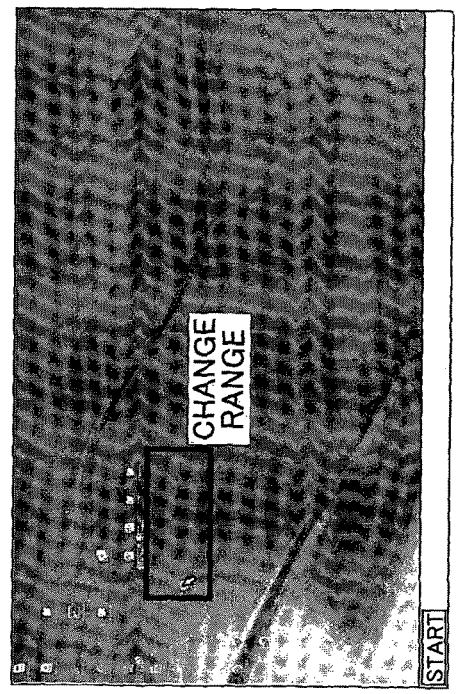

FIGS. 20C and 20D schematically illustrate another example of the screen change amount. FIGS. 20C and 20D show a screen display displaying a moving picture in the whole screen. Although it may be difficult to recognize the pictures due to monochrome printing, luminance for characters has changed. In this case, in comparison between FIGS. 20C and 20D, the change can be detected for almost the entire area (e.g., 1440×900).

Figure 21:
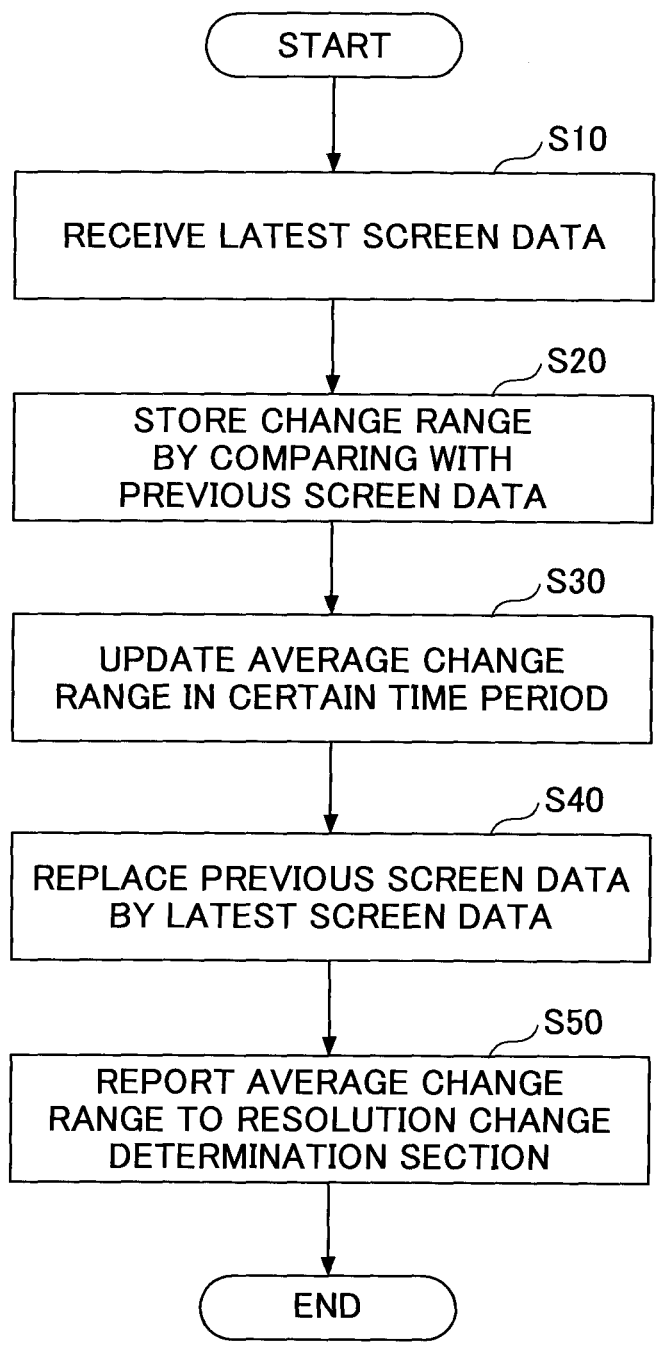
FIG. 21 is an example flowchart of a procedure of monitoring the screen change amount by a PC screen change amount monitoring section.

FIG. 21 is an example flowchart of a procedure where the PC screen change amount monitoring section 71 monitors the screen change amount.

The PC screen change amount monitoring section 71 acquires the latest screen data transmitted by the screen transmission section 63 (step S10).

The PC screen change amount monitoring section 71 compares the acquired latest screen data with the previous screen data and determines and stores a range of the pixels whose pixel values have been changed as a changed range (horizontal by vertical) (step S20).

The PC screen change amount monitoring section 71 calculates an average value of a pixel range where the change has been detected for a certain time period in the past. For example, when the certain time period is 10 seconds and if the screen acquisition section 67 acquires the screen thirty times per second, the screen acquisition section 67 calculates an average value of a changed range for three hundred times (10×30=300). By acquiring an average value in the past time range, it becomes possible to reduce the number of times changing the resolution of the client apparatus 21 based on transient changes in the screen. Here, the changed range or an average change range is an example of the claimed range information.

The PC screen change amount monitoring section 71 updates the calculated average change range which has been calculated already with the latest average change range which is calculated in step S20 (step S30).

The PC screen change amount monitoring section 71 replaces the previous screen data which are being stored, with the latest screen data which are acquired in step S10 (step S40).

The PC screen change amount monitoring section 71 reports the average change range to the resolution change determination section 62 (step S50). By doing this, it becomes possible for the resolution change determination section 62 to determine whether the resolution is to be changed.

FIG. 22 illustrates an example of reference values and operations of the client apparatus 21 corresponding to the resolutions. When the resolution of the client apparatus 21 is 1280×800, the reference value is, for example, 640×400 (an example of the claimed first threshold value). The resolution change determination section 62 determines that the resolution is set to be lower when the average change range exceeds the reference value, and determines that the resolution is set to be higher when the average change range is less than or equal to the reference value.

Similarly, when the resolution of the client apparatus 21 is 1024×768, the reference value is, for example, 512×384. The resolution change determination section 62 determines that the resolution is set to be lower when the average change range exceeds the reference value, and determines that the resolution is set to be higher when the average change range is less than or equal to the reference value.

When the screen change greatly, the processing load of the client apparatus 21 is accordingly increased. Therefore, when the processing load of the client apparatus 21 is heavy, the video output apparatus 11 may project an image without increasing the load.

Figure 23:
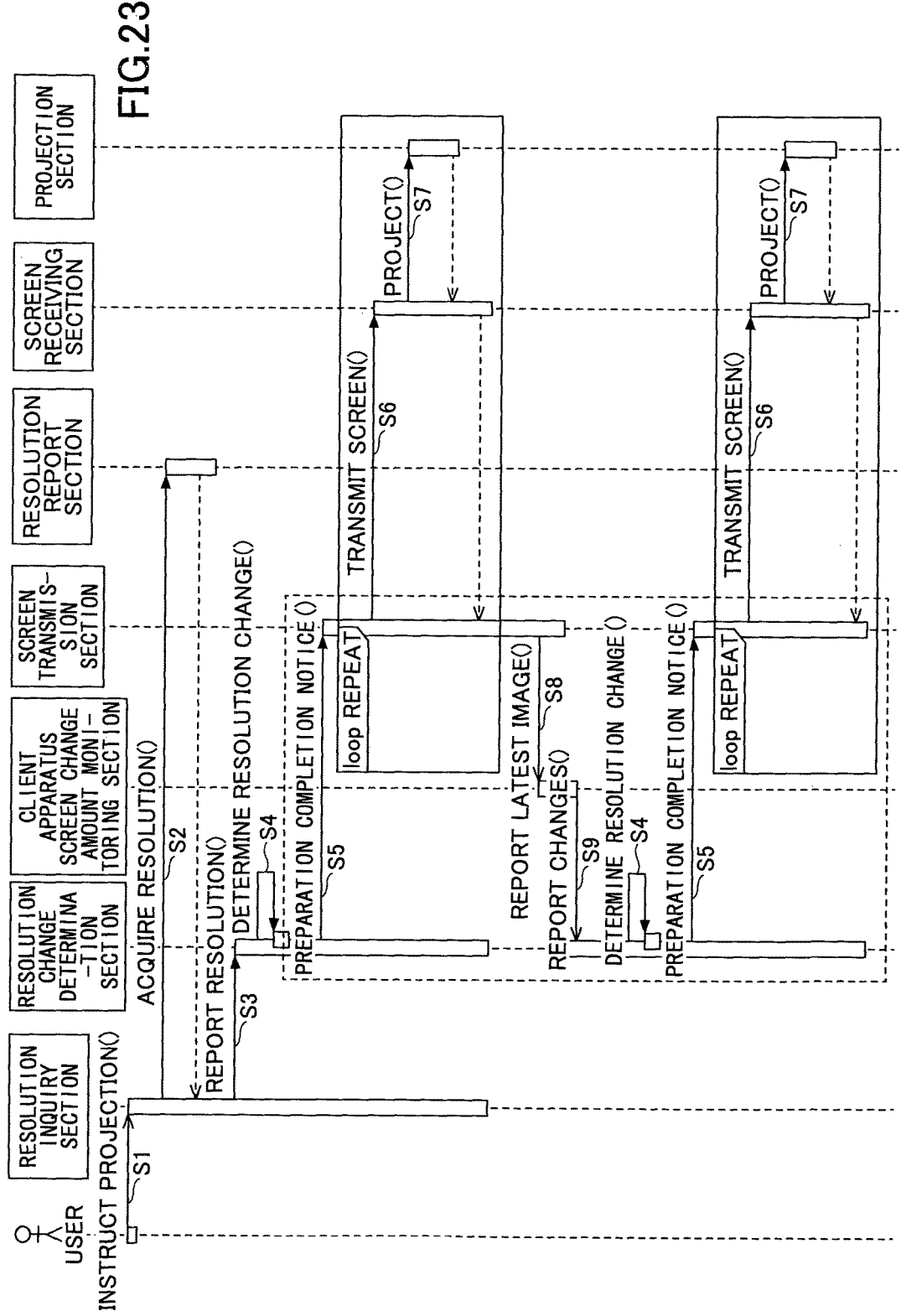
FIG. 23 is an example sequence diagram of an operational procedure of the client apparatus and the video output apparatus (fourth embodiment)

FIG. 23 is an example sequence diagram of an operational procedure of the client apparatus 21 and the video output apparatus 11. In the following, steps different from those in the first embodiment are described.

Step S5: The resolution change determination section 62 sends the preparation completion notice to the screen transmission section 63. After that, similar to the first embodiment, the screen transmission section 63 acquires the screen data and transmits the screen data to the screen receiving section 82. The projection section 83 projects the screen data from the optical engine 37.

Step S8: The screen transmission section 63 transmits the latest screen data to the PC screen change amount monitoring section 71.

Step S9: The PC screen change amount monitoring section 71 performs the process of FIG. 21, and reports the average change range to the resolution change determination section 62.

Step S4: The resolution change determination section 62 determines whether it is necessary to change the resolution. The process of step S4 is described below. After that, the process from step S5 is repeated.

Figure 24:
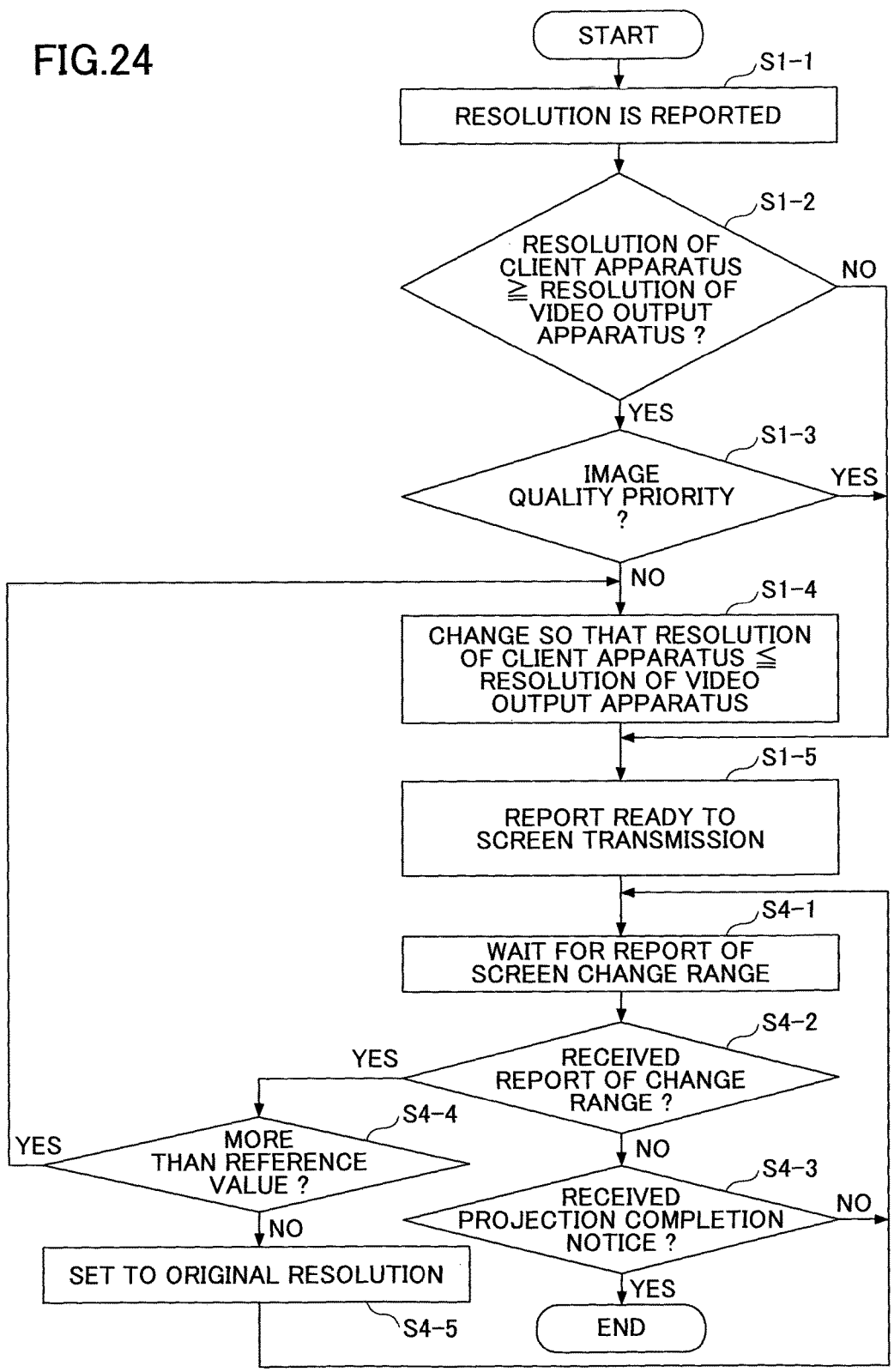
FIG. 24 is an example flowchart of a procedure for determining whether it is necessary for the resolution change determination section to change the resolution (fourth embodiment)

FIG. 24 is an example flowchart of a procedure of determining whether it is necessary for the resolution change determination section 62 to change the resolution. Steps S4-1 through S4-5 are added after step S1-5 of FIG. 9.

When the resolution change determination section 62 sends the preparation completion notice of the screen data transmission to the screen transmission section 63 (step S1-5), the resolution change determination section 62 waits for a report of the average change range from the PC screen change amount monitoring section 71 (step S4-1).

When the average change range is not reported (NO in step S4-2), and if no projection completion notice is received (NO in step S4-3), the resolution change determination section 62 still waits.

When the average change range is reported (YES in step S4-2), the resolution change determination section 62 determines whether the average change range exceeds the reference value (step S4-4).

When the average change range exceeds the reference value (YES in step S4-4), the screen change amount is large. Therefore, the resolution change determination section 62 changes the resolution of the client apparatus 21 (step S1-4).

When the average change range does not exceed the reference value (NO in step S4-4), the screen change amount is small. Therefore, the resolution change determination section 62 changes the resolution to the resolution that was set before the resolution of the client apparatus 21 was changed (step S4-5). By doing this, it becomes possible to change the resolution of the client apparatus 21 in accordance with the screen change amount.

As described above, in the video output system according to this embodiment, when the screen change amount of the client apparatus is large, the resolution is lowered to lower the processing load of the client apparatus 21. By doing this, it becomes possible to reduce the delay during the data transmission and the delay phenomenon of the video output apparatus 11.

Fifth Embodiment

In this embodiment, a video output system 100 is described where the client apparatus 21 changes the resolution of the client apparatus 21 based on a time period required to project one frame of screen data by the video output apparatus 11. During the time period required to project one frame of screen image data, the processing load is high. Therefore, when the processing load of the client apparatus is high, the resolution is changed.

Figure 25:
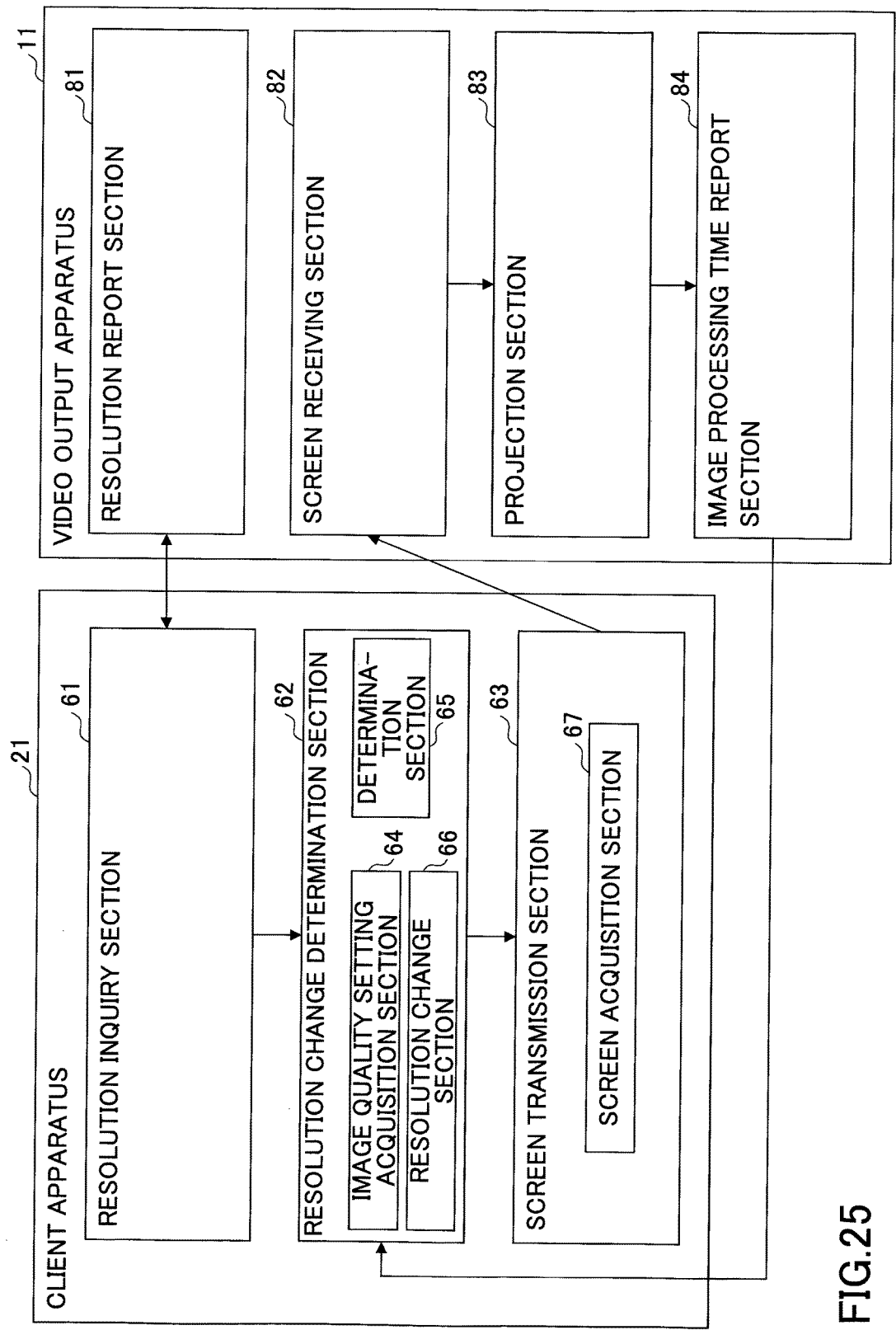
FIG. 25 illustrates an example block diagram of the video output system (fifth embodiment)

FIG. 25 is an example block diagram of the video output system 100. The video output apparatus 11 includes an image processing time report section 84. The image processing time report section 84 transmits (reports) the time period, which is required for the video output apparatus 11 to display one frame of an image (hereinafter may be simplified as "processing time"), to the client apparatus 21. Namely, the processing time refers to a time interval of the projection of frame data (between when one image is projected and when the next image is projected).

When the processing time is greater than or equal to a threshold value, the resolution change determination section 62 determines that the resolution of the client terminal is to be set to the resolution of the video output apparatus 11. When processing time is less than the threshold value, the resolution change determination section 62 determines that the resolution of the client terminal is to be set to the original resolution (i.e., the resolution before being changed). For example, it is preferable that thirty frames of video be updated per second, and it is therefore assumed that the video output apparatus 11 is capable of projecting thirty frames of images per second. In this case, the threshold value (an example of the claimed second threshold value) is 33 milliseconds (1000 milliseconds/30). When a time period greater than the threshold value, it is supposed that a heavy processing load is applied to the video output apparatus 11.

Therefore, the resolution of the client apparatus 21 can be changed based on the comparison between the processing time and the threshold value. Namely, the resolution of the client apparatus 21 can be changed based on the processing load of the video output apparatus 11.

FIG. 26 illustrates example operations of the client apparatus 21 based on the processing time. When the processing time required for processing video data is thirty milliseconds, the processing time is less than the threshold value which is 33 milliseconds. Therefore, the client apparatus 21 does not do anything about the resolution. When the processing time required for processing video data is sixty milliseconds, the processing time is greater than or equal to 33 milliseconds. Therefore, the client apparatus 21 changes the resolution of the client apparatus 21 to be equal to the resolution of the video output apparatus 11.

Figure 27:
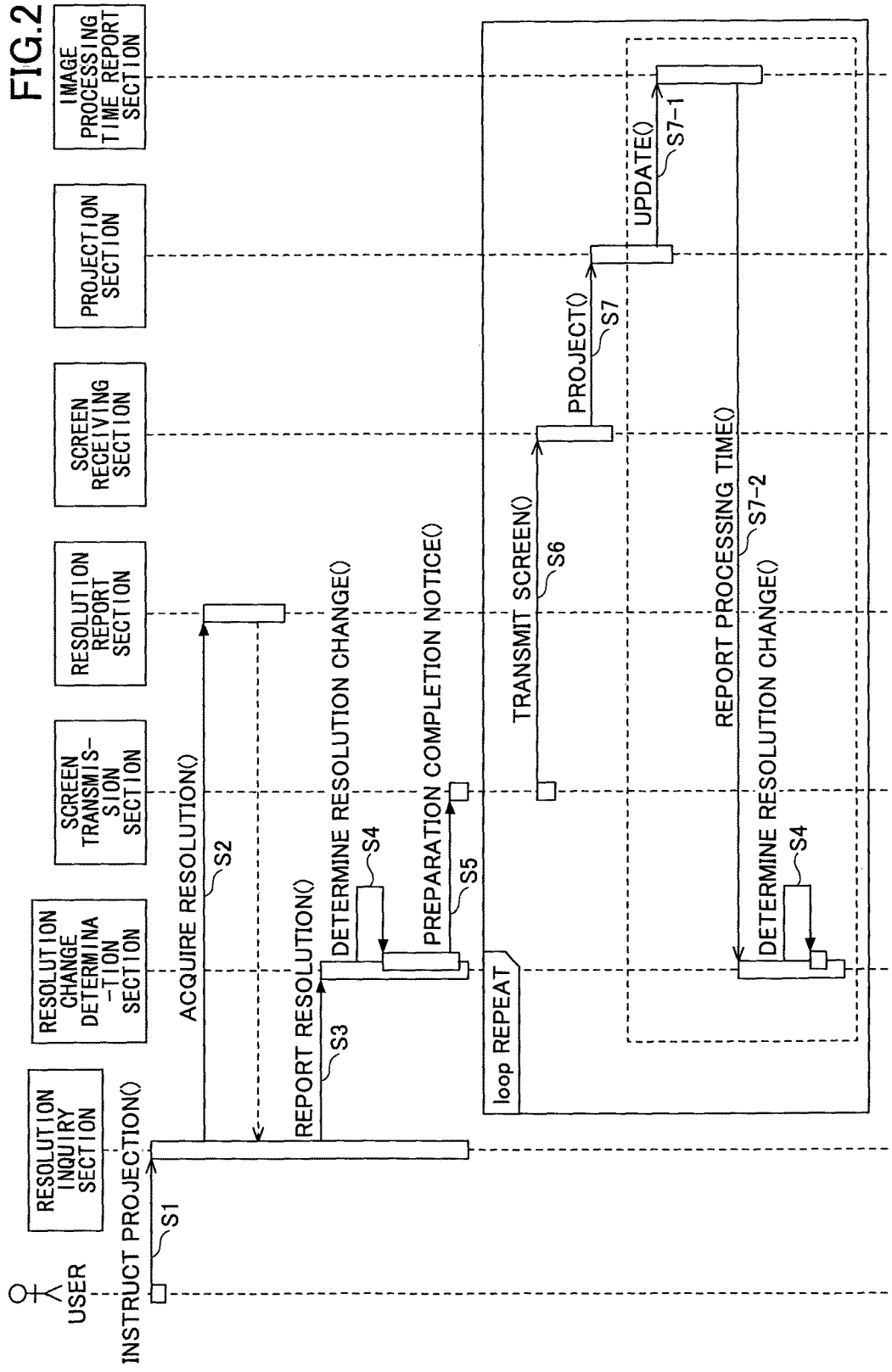
FIG. 27 is an example sequence diagram of an operational procedure of the client apparatus and the video output apparatus (fifth embodiment)

FIG. 27 is an example sequence diagram of an operational procedure of the client apparatus 21 and the video output apparatus 11. In the following, steps different from those in the first embodiment are described.

Step S6: The screen transmission section 63 acquires screen data, and transmits the screen data to the screen receiving section 82.

Step S7: The projection section 83 of the video output apparatus 11 projects the screen data from the optical engine 37.

Step S7-1: The projection section 83 reports the update of an image to be projected to the image processing time report section 84.

Step S7-2: The image processing time report section 84 measures the processing time and reports the processing time to the resolution change determination section 62.

Step S4: The resolution change determination section 62 determines whether it is necessary to change the resolution. The process in step S4 is described below.

Figure 28:
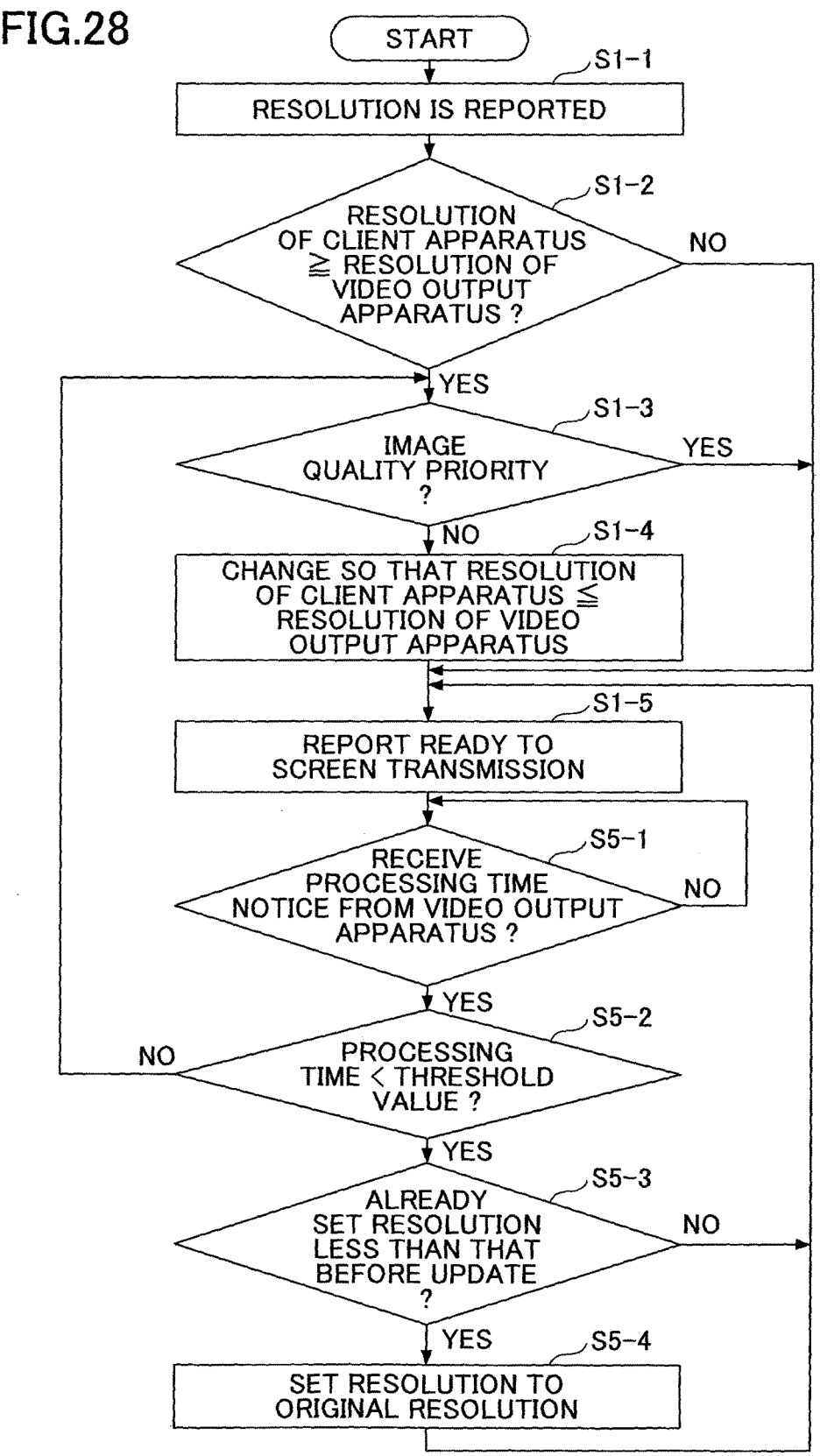
FIG. 28 is an example flowchart of a procedure for determining whether it is necessary for the resolution change determination section to change the resolution.

FIG. 28 is an example flowchart of a procedure for determining whether it is required to change the resolution by the resolution change determination section 62. Steps S5-1 through 5-4 are added after step S1-5 of FIG. 9.

When the resolution change determination section 62 outputs the preparation completion notice of the screen data transmission to the screen transmission section 63 (step S1-5), the resolution change determination section 62 waits for the report of the processing time from the image processing time report section 84 (step S5-1).

When receiving the report of the processing time (YES in step S5-1), the resolution change determination section 62 determines whether the processing time is less than the threshold value (step S5-2).

When the processing time is not less than the threshold value (NO in step S5-2), the time required for projecting one frame of image is long. Therefore, the resolution is changed based on the setting of the image quality priority box 521 (steps S1-3 and S1-4).

When the processing time is less than the threshold value (YES in step S5-2), the video output apparatus 11 has sufficient processing capability. Therefore, it is determined whether the resolution, which is lower than the resolution before the resolution change section 66 changed, is being set (step S5-3).

When it is determined that the resolution is lower than the resolution before the resolution change section 66 changed (YES in step S5-3), the resolution change determination section 62 determines that the resolution of the client apparatus 21 is to be set to be the original resolution (step S5-4). After that, the process goes back to step S1-5, so that the resolution change section 66 repeatedly determines whether the resolution is to be changed based on the processing time.

As described above, in the video output system 100 according to this embodiment, the processing load of the video output apparatus 11 can be estimated based on the updating time of the image of the video output apparatus 11, and the resolution of the client apparatus 21 can be changed. Therefore, it becomes possible to transmit the screen data having the resolution lower than or equal to the resolution of the video output apparatus 11 so as to reduce the processing load on the video output apparatus 11.

Sixth Embodiment

In this embodiment, a video output system 100 including a plurality of video output apparatuses 11 is described.

Figure 29:
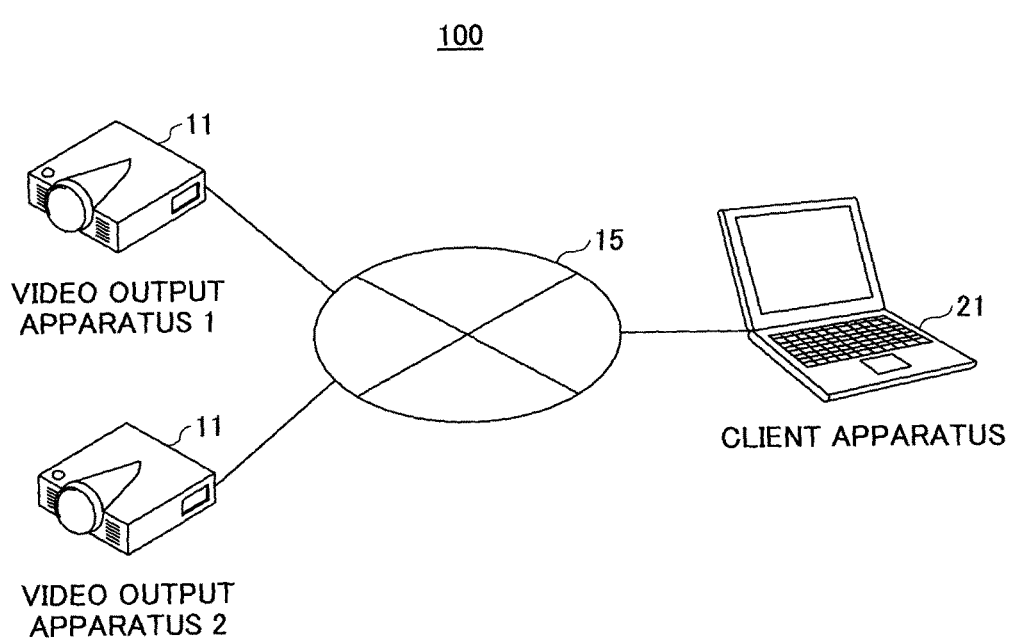
FIG. 29 illustrates an example block diagram of the video output system (sixth embodiment)

FIG. 29 is an example block diagram of the video output system 100. Two video output apparatuses 11 are communicably connected to a client apparatus 21 via a network 15. The client apparatus 21 is capable of transmitting the same screen data to the video output apparatuses 11. To transmit the screen data to the video output apparatuses 11, the processing load of the client apparatus 21 is more likely to be increased. For example, in a case of TCP/IP transmission, a transmission procedure may become complicated because the client apparatus 21 receives ACK in response to the screen data (divided in packets) and then transmits the next screen data. Therefore, the processing load of the client apparatus 21 is more likely to be increased.

In this embodiment, when the client apparatus transmits the screen data to a plurality of video output apparatuses 11, the resolution of the client apparatus 21 is set to be less than or equal to the resolution of the video output apparatuses 11.

The block diagram of the video output system 100 is omitted because the block diagram thereof is similar to that, of FIG. 5 in the first embodiment. Also, the sequence diagram of the video output system 100 is similar to that of FIG. 8.

Figure 30:
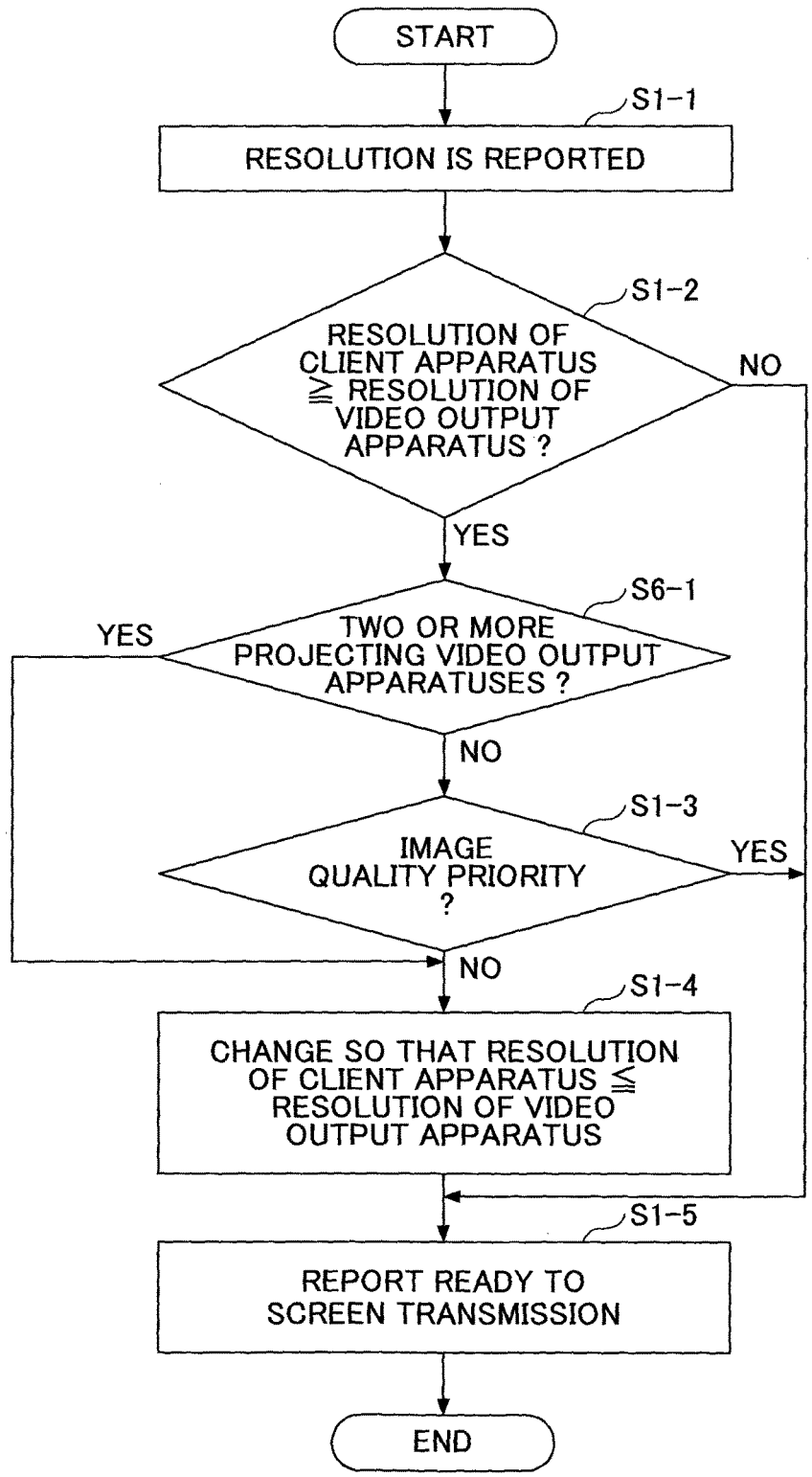
FIG. 30 is an example flowchart of a procedure for determining whether it is necessary for the resolution change determination section to change the resolution (sixth embodiment)

FIG. 30 is an example flowchart of a procedure determining whether it is necessary for the resolution change determination section 62 to change the resolution. A new step S6-1 is added to the flowchart of FIG. 9.

When the resolution of the client apparatus 21 is higher than the resolution of the video output apparatus 11, the resolution change determination section 62 determines whether the number of the video output apparatuses 21 to which the screen data are to be transmitted is more than one (step S6-1).

The video output apparatuses 11 to which the screen data are to be transmitted are designated in the projector designating column 511 of the projection start screen 501. Therefore, the number of the video output apparatuses 11 to which the screen data are to be transmitted for the client apparatus 21 is obvious. Also, by querying the OS or a protocol stack, it is possible to acquire a response indicating the currently established TCP connections. Therefore, it becomes possible to determine whether the number of the video output apparatuses 21 to which the screen data are to be transmitted is more than one.

When determining that the number of the video output apparatuses 21 to which the screen data are to be transmitted is more than one (YES in step 6-1), the resolution change determination section 62 changes the resolution of the client apparatus 21 to be lower than or equal to the resolution of the video output apparatuses 11 (step S1-4). The resolutions of the video output apparatuses may be different from each other. This case will be discussed in a seventh embodiment.

When determining that the number of the video output apparatuses 21 to which the screen data are to be transmitted is not more than one (NO in step 6-1), the resolution change determination section 62 sets the resolution of the client apparatus 21 in accordance with the setting of the image quality priority box 521 similar to the case of FIG. 9.

Therefore, according to this embodiment, in the case where the number of the video output apparatuses 21 to which the screen data are to be transmitted is more than one so that the processing load of the client apparatus 21 is increased, the resolution of the client apparatus 21 is set to be lower than or equal to the resolution of the video output apparatuses 11. By doing this, the transmission delay is unlikely to occur, thereby reducing the delay phenomenon.

Seventh Embodiment

In this embodiment, a video output system 100 is described where the number of the video output apparatuses 11 is more than one and the resolutions of the video output apparatuses are different from each other and the resolution of the client apparatus 21 is set to be equal to the resolution which is the lowest among the video output apparatuses 11.

Figure 31:
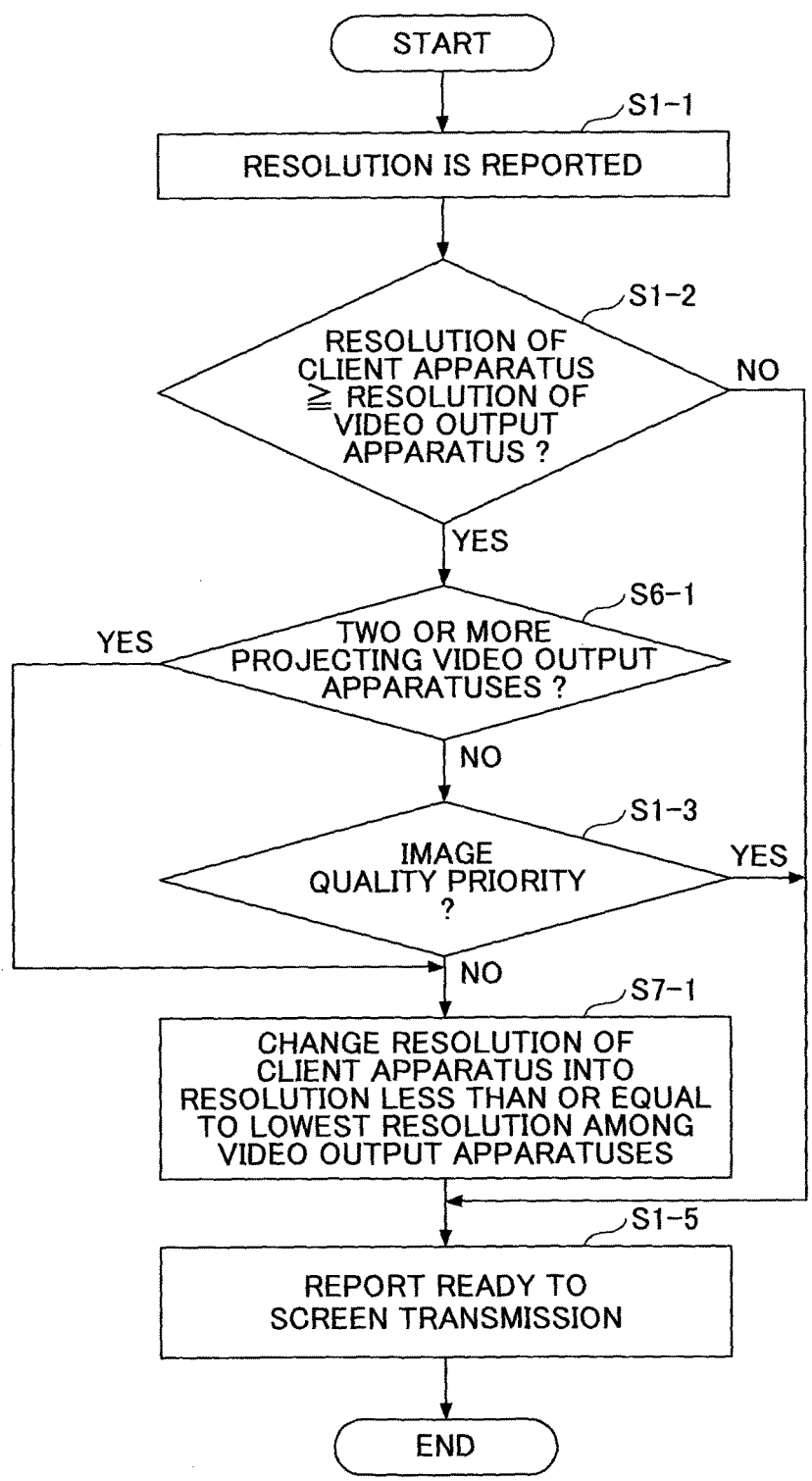
FIG. 31 is an example flowchart of a procedure for determining whether it is necessary for the resolution change determination section to change the resolution (seventh embodiment)

FIG. 31 is an example flowchart of a procedure determining whether it is necessary for the resolution change determination section 62 to change the resolution. A new step S7-1 is added to the flowchart of FIG. 30.

The resolutions of the video output apparatuses 11 are reported to the resolution change determination section 62 (step S1-1). Namely, the resolutions of all the video output apparatuses 11 to which the screen data are to be transmitted are reported.

The determination section 65 determines whether the resolution of the client apparatus 21 is greater than the resolution which is the lowest among the video output apparatuses 11 (step S1-2).

When the resolution of the client apparatus 21 is not greater than the lowest resolution among the video output apparatuses 11 (NO in step S1-2), it is not necessary to lower the resolution any more. Therefore, the resolution change determination section 62 transmits the preparation completion notice of the screen data transmission to the screen transmission section 63 (step S1-5).

When the resolution of the client apparatus 21 is greater than the lowest resolution among the video output apparatuses 11 (YES in step S1-2), the resolution change determination section 62 determines whether the number of the video output apparatuses 11 to which screen data are to be transmitted is more than one (step S6-1).

When determining that the number of the video output apparatuses 11 to which screen data are to be transmitted is not more than one (NO in step S6-1), the determination section 65 refers to the image quality priority flag to determine whether the image quality priority is set in the client apparatus 21 (step S1-3).

When determining that the number of the video output apparatuses 11 to which screen data are to be transmitted is more than one (YES in step S6-1), the resolution change section 66 determines that the resolution of the client apparatus 21 is to be set to the lowest resolution among the video output apparatuses 11 (step S7-1). By doing this, it becomes no longer necessary for the video output apparatus 11 having the lowest resolution to change the resolution thereof, so as to prevent the increase of the processing loads of all the video output apparatuses 11 which are in communications.

The resolution change determination section 62 transmits the preparation completion notice of the screen data transmission to the screen transmission section 63 (step S1-5).

Therefore, in the video output system 100 according to this embodiment, it becomes possible to prevent the state where the processing load is applied only to a specific video output apparatus 11 (having the resolution which is not the highest). As a result, the delay phenomenon is less likely to occur in the video output apparatus 11, so that it becomes possible for the video output system 100 to project the screens in synchronization among the video output apparatuses 11.

Eighth Embodiment

In this embodiment, a video output system 100 is described where the video output system 100 includes a plurality of video output apparatuses 11, the client apparatus 21 is in communication with one or more video output apparatuses 11, and the resolution of the client apparatus 21 is set to be equal to the resolution which is the lowest among the video output apparatuses 11. By dynamically reviewing the resolutions, it becomes possible to optimally maintain the resolutions of the screen data transmitted and received in the video output system 100 while maintaining the synchronization of the screens projected by the video output apparatuses 11.

Figure 32:
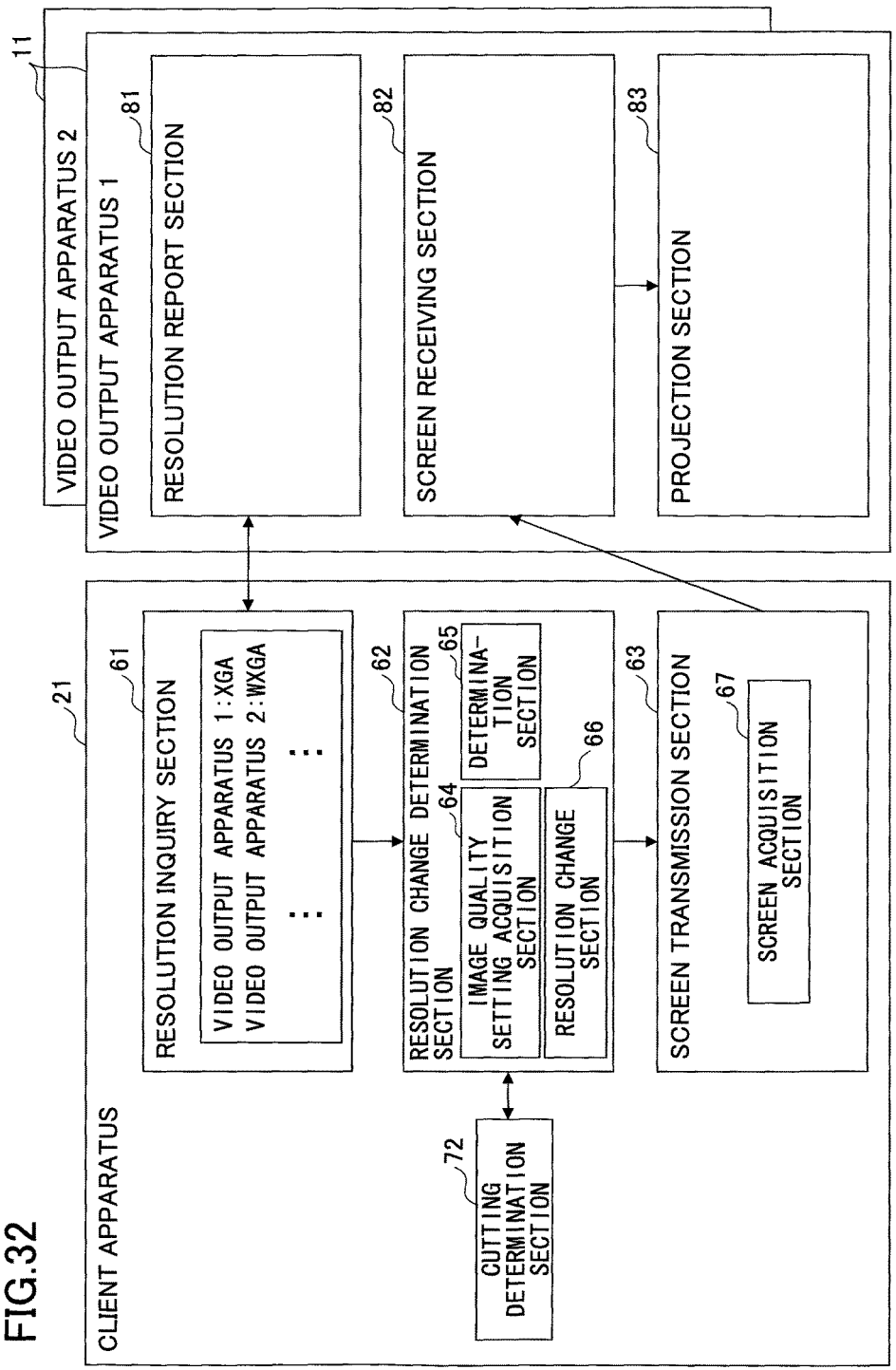
FIG. 32 illustrates an example block diagram of the video output system (eighth embodiment)

FIG. 32 is an example block diagram of the video output system 100. The resolution change section 66 of the client apparatus 21 includes a cutting determination section 72. The cutting determination section 72 periodically inquires about a TCP connection state from, for example, the OS or the protocol stack. The cutting determination section 72 determines whether there is any connection that has been cut lately by storing the transmission destinations of the screen data where the connection is established upon the latest inquiry and comparing the transmission destinations upon the latest inquiry and the transmission destinations which are acquired after the latest inquiry (substantially the latest inquiry at the comparison time point). When determining that there is a cut transmission destination, the cutting determination section 72 reports the identification information (e.g., an identification code, a projector name, and an IP address) of the cut video output apparatus 11 to the resolution inquiry section 61.

The resolution inquiry section 61 stores the resolution data in association with the identification information of the video output apparatuses 11. The resolution inquiry section 61 deletes the identification information of the reported video output apparatus 11 and the associated resolution, and reports the lowest resolution among the rest of the resolutions to the resolution change determination section 62. By doing this, the resolution change determination section 62 can set the resolution of the client apparatus 21 to the resolution of the video output apparatus 11 having the lowest resolution.

Figure 33:
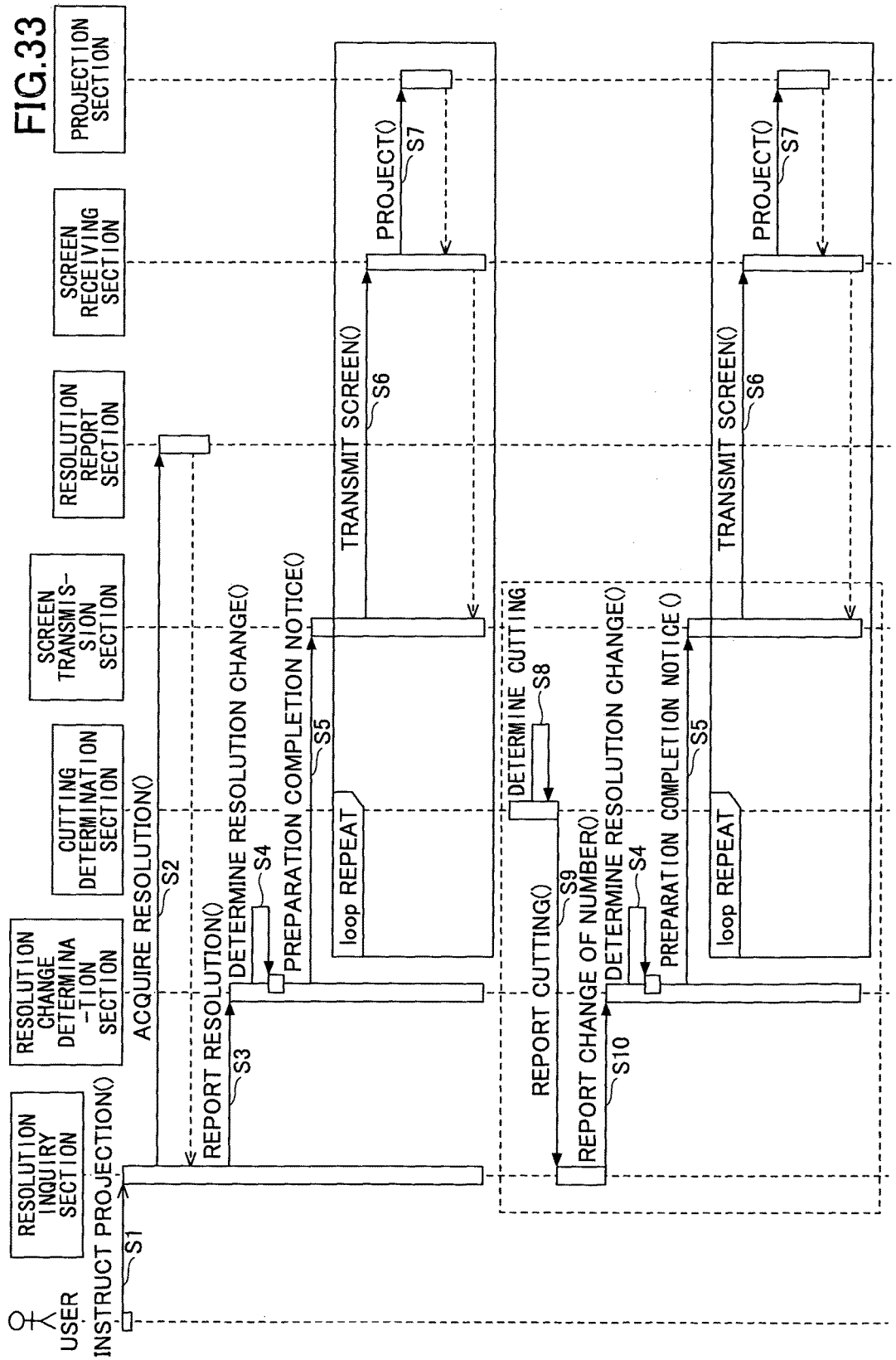
FIG. 33 is an example sequence diagram of an operational procedure of the client apparatus and the video output apparatus (eighth embodiment)

FIG. 33 is an example sequence diagram of an operational procedure of the client apparatus 21 and the video output apparatus 11. In the following, steps different from those in the first embodiment are described.

S5: The resolution change determination section 62 transmits the preparation completion notice to the screen transmission section 63.

S8: The cutting determination section 72 periodically determines whether there is any communication with the video output apparatus 11.

S9: When determining that communication with the video output apparatus 11 is cut, the cutting determination section 72 sends a cut notice to the resolution inquiry section 61. The cut notice includes the identification information of the video output apparatus 11.

S10: The resolution inquiry section 61 reports the lowest resolution among the video output apparatuses 11 whose communications are not cut and a number change notice to the resolution change section 66.

S4: The resolution change determination section 62 determines whether it is required to change the resolution. The process in step S4 is described below.

S5: The resolution change determination section 62 transmits the preparation completion notice to the screen transmission section 63. After that, a process is similar to that in the first embodiment.

Figure 34:
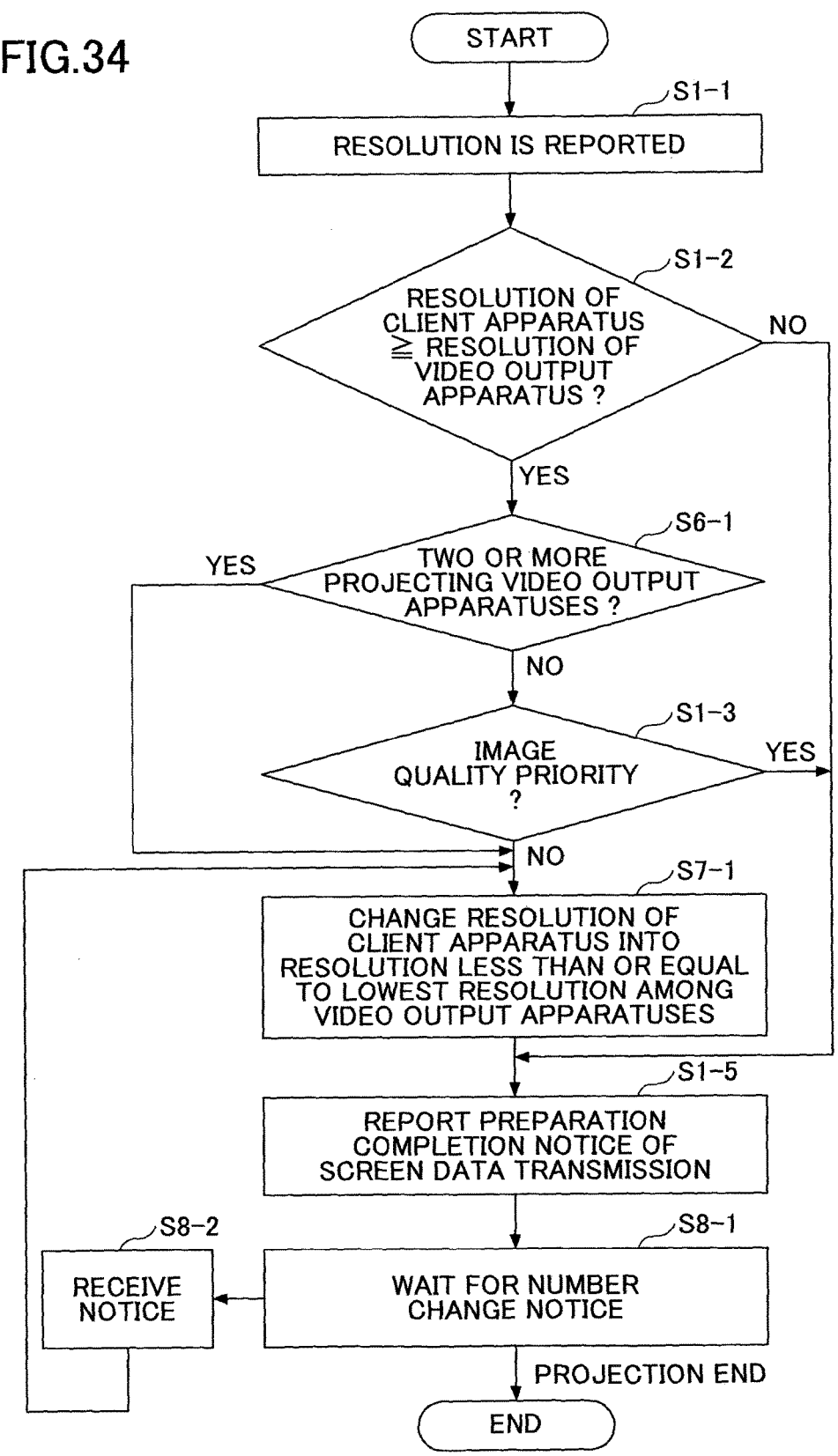
FIG. 34 is an example flowchart of a procedure for determining whether it is necessary for the resolution change determination section to change the resolution (eighth embodiment)

FIG. 34 is an example flowchart of a procedure for determining whether it is necessary for the resolution change determination section 62 to change the resolution. New steps S8-1 and S8-2 are added to the flowchart of FIG. 31.

In step S1-5, when the resolution change determination section 62 transmits the preparation completion notice of the screen data transmission to the screen transmission section 63 (step S1-5), the resolution change section 66 waits for the receipt of the number change notice (step S8-1). The number change notice may not be received in some cases. Therefore, when the number change notice is not received, the resolution change section 66 does not do anything.

When the change notice is received (step S8-2), the resolution change determination section 62 changes the resolution of the client apparatus 21 so as to be equal to the resolution which is the lowest among the video output apparatuses 11 included in the change notice.

As described above, in the video output system 100, when communication is cut in a case of simultaneous projection using a plurality of video output apparatuses 11, the resolution setting is revised. By doing this, it becomes possible to always optimize the resolution of the screen data.

Ninth Embodiment

In the first through the eighth embodiments, when the image quality priority is set, the screen having the resolution of the client apparatus 21 are transmitted. However, in such cases, when the client apparatus 21 continuously transmits still images or transmits video data, the required processing capacity may exceed the reproduction capability of the video output apparatus 11, so that the video output apparatus 11 may not appropriately (smoothly) reproduce the screen.

In this embodiment, a video output system 100 is described where, in the transmission of video data or continuous still image data (hereinafter simplified as "still image data"), the client apparatus 21 transmits the screen data in view of the reproduction capability of the video output apparatus 11.

Here, the convenience where images cannot be appropriately (smoothly) reproduced is not limited to the case where the image quality priority is set. Therefore, this embodiment is described regardless whether the image quality priority is set.

Figure 35:
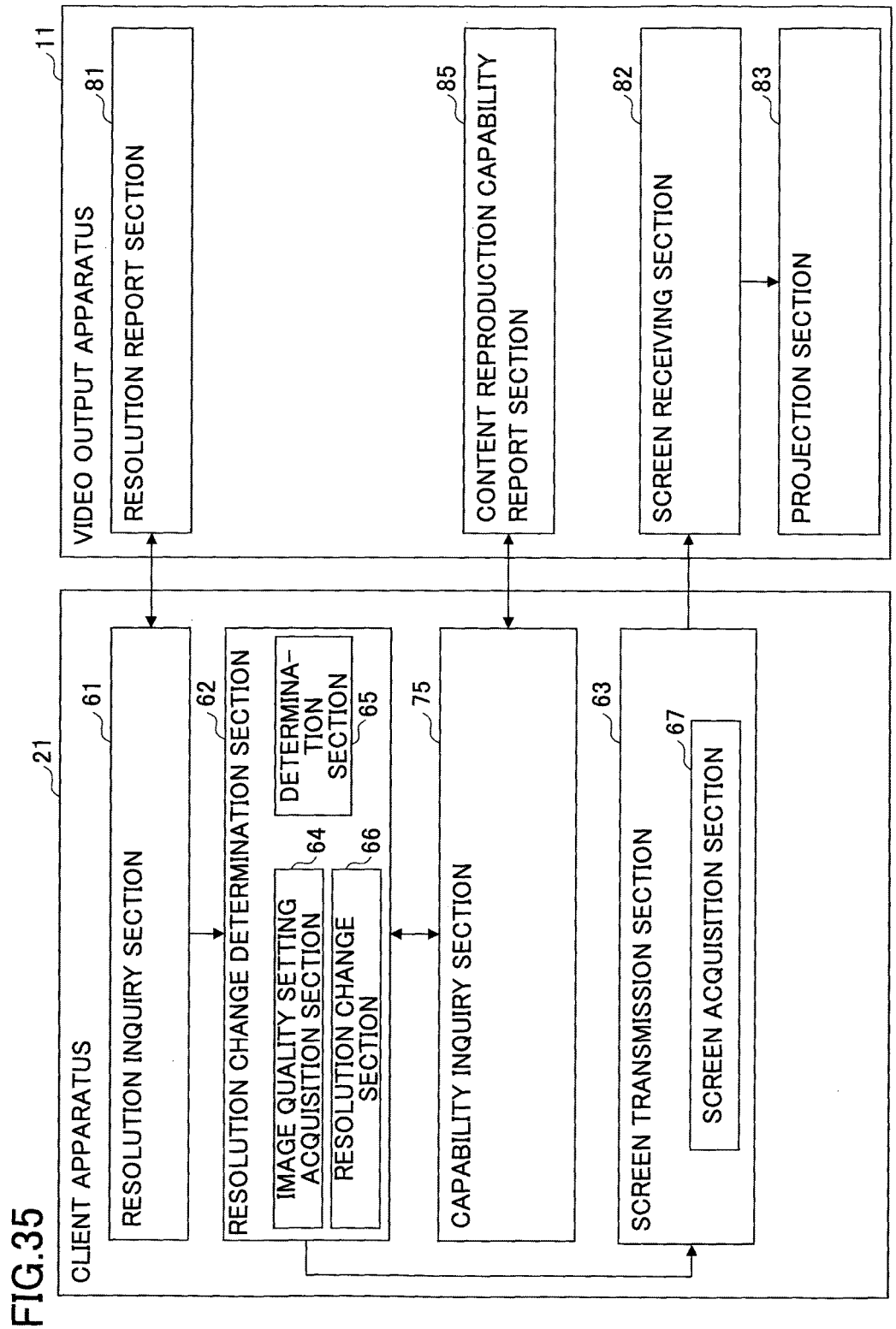
FIG. 35 illustrates an example block diagram of the video output system (ninth embodiment)

FIG. 35 is an example block diagram of the video output system 100 according to this embodiment. The client apparatus 21 includes a capability inquiry section 75. The capability inquiry section 75 inquires about the reproduction capability from the video output apparatus 11. The "reproduction capability" is described. The reproduction capability is reported to the resolution change determination section 62.

The resolution change determination section 62 in this embodiment includes a data transmission setting section 76. The data transmission setting section 76 limits the data transmission setting of the screen transmission section 63 so as to be less than or equal to the reproduction capability which is reported from the video output apparatus 11. The data transmission setting includes a data resolution, the maximum data rate, and the maximum frame rate. In case of the transmission of the still image data, the maximum data rate is not included.

Further, the video output apparatus 11 includes a content reproduction capability report section 85. The content reproduction capability report section 85 reports the reproduction capability of the video output apparatus 11 in response to the inquiry from the capability inquiry section 75.

FIG. 36 illustrates an example of a reproduction capability list of the video output apparatus 11. As the reproduction capability of video data, the "data resolution", the "maximum data rate [Mbit/s]", and the "maximum frame rate [fps]" are specified for each "reproducible format".
Data resolution: The data resolution refers to the resolution of the screen data while the data resolution refers to the maximum resolution on the basis of the specification of the video output apparatus 11 in the first through the eighth embodiments.
Maximum data rate: This refers to the maximum data transfer rate per unit time.
Maximum frame rate: This refers to the maximum number of transfer frames per unit time. The data amount of a piece of image data differs depending on the compression ratio. Therefore, there is no proportional relationship between the maximum frame rate and the maximum data rate. For example, even when the maximum data rate is low, if the compression ratio is high, the maximum frame rate is high.

As the reproduction capability of still image data, the "data resolution" and the "maximum frame rate [fps]" are specified for each "reproducible format". As an example state of the continuous transmission of the still image data, the client apparatus 21 sequentially projects the image data such as a slide show.

The formats described in the "reproducible format" are examples only. For example, MPEG2 and MPEG4 may be included in as the "reproducible format" of the video data. Also, for example, PNG, GIF, and BMP may be included in as the "reproducible format" of the still image data.

In this embodiment, the data indicating which of the video data or the still image data the user puts a priority on is acquired based on the setting on the setting screen of FIG. 7B. In the setting screen of FIG. 7B, there are the image quality priority box 521 and the voice transmission box 522. The image quality priority box 521 accepts the setting whether priority is placed on image quality, and the voice transmission box 522 accepts the setting whether voice data are transmitted. When the image quality priority box 521 is checked, it is thought that the user puts a priority on the image quality. In this regard, the resolution change determination section 62 determines the data transmission setting as follows depending on the setting of the image quality priority box 5210. Image quality priority box=ON: The reproduction capability is determined only based on the data resolution in the reproduction capability list. Image quality priority box=OFF: The reproduction capability mostly suited to the video data transmission is determined from among the combinations of the "data resolution", the "maximum data rate", and the "maximum frame rate" of the reproduction capability.

For example, in a case of "image quality priority box=ON" and the JPEG (still image data) continuous transmission by the client apparatus 21, the resolution change determination section 62 transmits the screen data at 1920× 1080 data resolution. Accordingly, the maximum frame rate is 10 fps.

In a case of "image quality priority box=ON" and the H.264 (video data) transmission by the client apparatus 21, the resolution change determination section 62 transmits the screen data at 1920×1080 data resolution. Accordingly, the maximum data rate is 20 Mbit/s and the maximum frame rate is 24 fps.

In a case of "image quality priority box=OFF", the resolution change determination section 62 determines the data resolution based on the maximum data rate or the maximum frame rate on which priority is placed. For example, the data resolution may be determined based on the maximum frame rate.

In a case of "image quality priority box=OFF" and the JPEG (still image data) continuous transmission by the client apparatus 21, the resolution change determination section 62 selects the maximum data resolution where the frame rate is less than or equal to that of the still image data of the client apparatus 21. For example, in the case of "frame rate of the still image data=15" of the client apparatus 21, the data resolution 1920×1080 is selected. In the case of "frame rate of the still image data=20" of the client apparatus 21, the data resolution 1280×720 is selected.

In a case of "image quality priority box=OFF" and the H.264 (video data) transmission by the client apparatus 21, the resolution change determination section 62 selects the maximum data resolution where the frame rate is less than or equal to that of the video data of the client apparatus 21.

For example, in the case of "frame rate=24" of the client apparatus 21, the data resolution 1920×1080 is selected. In the case of "frame rate=40" of the client apparatus 21, the data resolution 640×360 is selected.

By doing this, it becomes possible to select an appropriate reproduction capability upon the user setting and the transmission of the still image data and the video data and limit the data transfer rate of the client apparatus 21.

Further, the resolution of the maximum frame rate or the maximum data rate may be selected regardless of the frame rate of the client apparatus 21. In this case, the resolution 1280×720 for the maximum frame rate=30 in the transmission of the still image data or the resolution 640×3600 for the maximum frame rate=60 in the transmission of the video data is selected.

Figure 37:
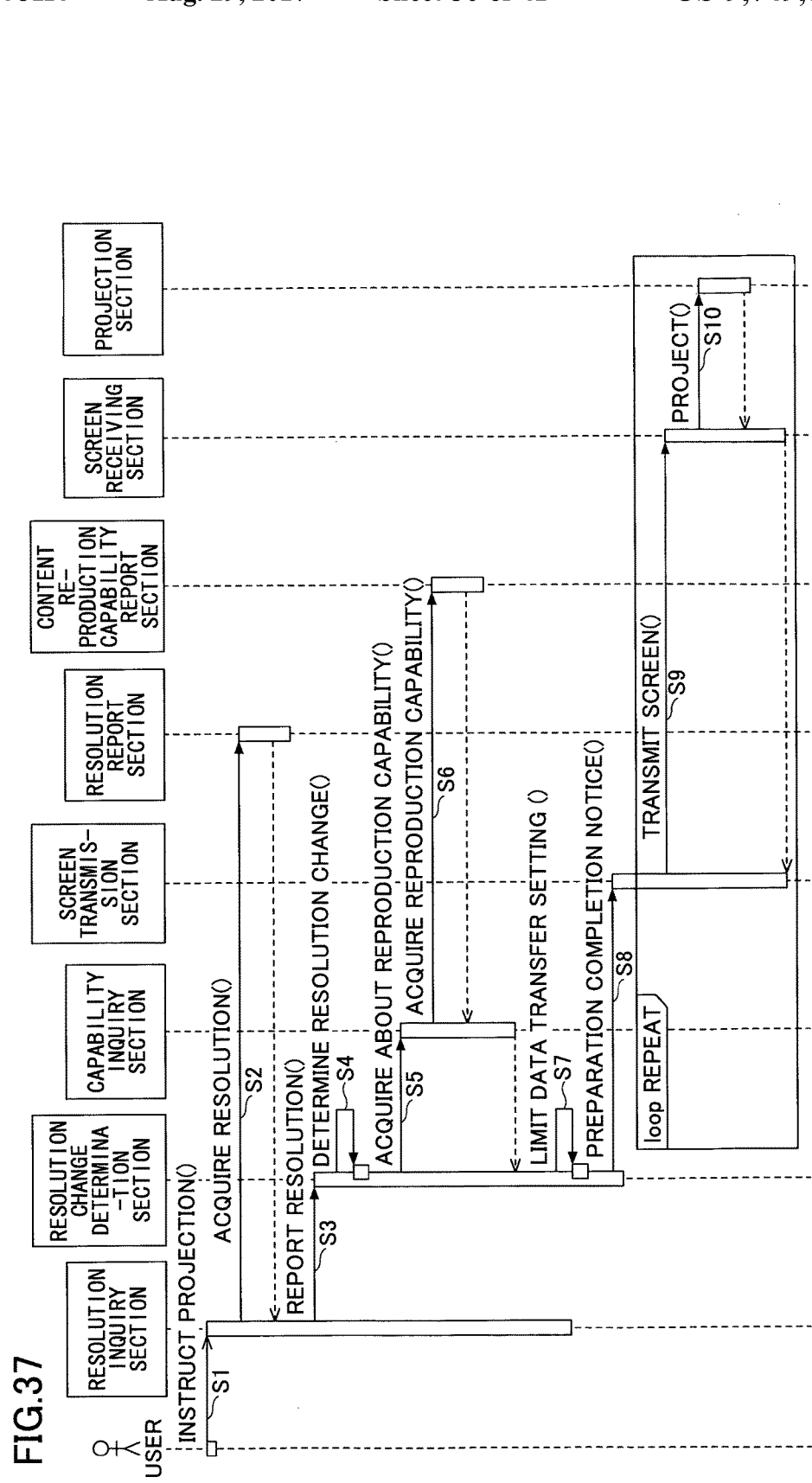
FIG. 37 is an example sequence diagram of an operational procedure of the client apparatus and the video output apparatus (eighth embodiment)

FIG. 37 is an example sequence diagram of an operational procedure of the client apparatus 21 and the video output apparatus 11.

S1: A user presses the projection button 512.

S2: When the user presses the projection button 512, in order for the client apparatus 21 to transmit the screen data, the resolution inquiry section 61 inquires about the resolution from the resolution report section 81.

S3: The resolution inquiry section 61 reports the resolution to the resolution change determination section 62.

S4: The resolution change determination section 62 determines whether it is necessary to change the resolution.

S5: The resolution change determination section 62 sends a request to the capability inquiry section 75 for acquiring the reproduction capability.

S6: The capability inquiry section 75 inquires about the reproduction capability from the content reproduction capability report section 85. The step S5, the reproduction capability and the resolution may be acquired. By doing this, step S2 may be removed. In this case, the reproduction capability list of FIG. 36, the "resolution" may be stored along with the "reproducible format", the "data resolution", the "maximum data rate", and the "maximum frame rate".

S7: When the reproduction capability is acquired, the resolution change determination section 62 limits the data transfer setting. The process in step S6 is described below.

S8: The resolution change determination section 62 transmits the preparation completion notice to the screen transmission section 63.

S9: The screen transmission section 63 acquires the screen data, and transmits the screen data to the screen receiving section 82.

S10: The projection section 83 of the video output apparatus 11 projects the screen data from the optical engine 37.

Figure 38:
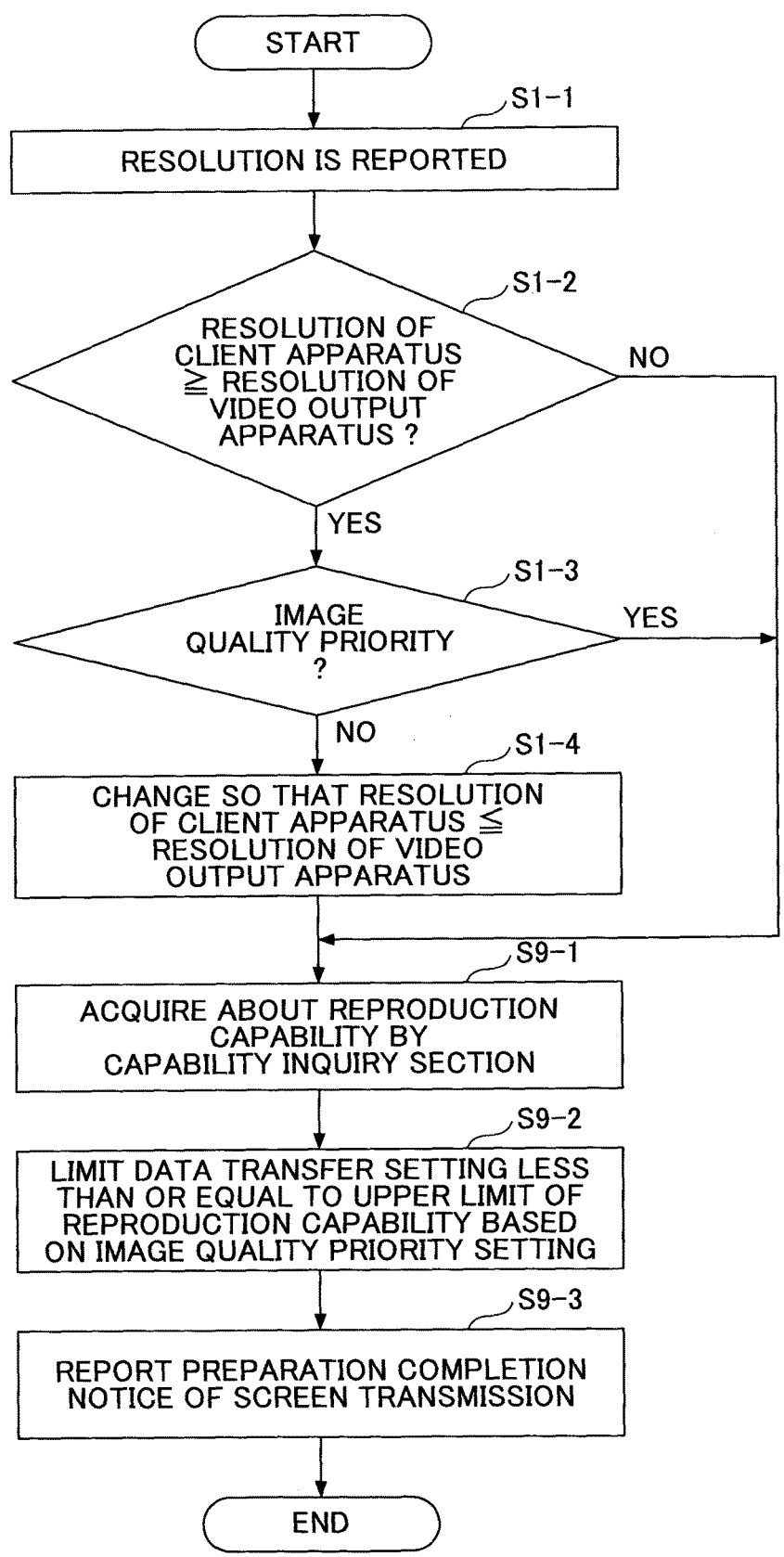
FIG. 38 is an example flowchart of a procedure for the resolution change determination section to determine a data transmission setting in steps S4 and S7 in FIG. 37.

FIG. 38 is an example flowchart of a procedure that the resolution change determination section 62 determines the data transfer setting in steps S4 and S7 of FIG. 37. The process of steps S1-1 through S1-4 is similar to that in the first embodiment of FIG. 9, and the description thereof is omitted.

Regardless of whether the image quality priority is set in step S1-3, next, the capability inquiry section 75 acquires the reproduction capability list from the content reproduction capability report section 85 (step S9-1).

The data transmission setting section 76 limits the data transfer setting to be equal to or less than the upper limit of the reproduction capability based on the image quality priority box 521 (step S9-2).

Next, the resolution change determination section 62 transmits the preparation completion notice of the screen data transmission to the screen transmission section 63 (step S9-3).

As described above, the client apparatus 21 limits the data transfer setting based on the upper limit of the reproduction capability of the video output apparatus 11. Therefore, in the transmission of the video data and the still image data, it becomes possible for the video output apparatus 11 to appropriately (smoothly) reproduce the screen.

Tenth Embodiment

In this embodiment, a client apparatus 21 is described that determines the data transfer setting based on the reproduction capability of the projector having the lowest reproduction capability when the video data or the still image data are to be transmitted to a plurality of projectors. As illustrated in FIG. 30, a video output system 100 may include a plurality of video output apparatuses 11. In this embodiment, the client apparatus 21 limits the data transfer setting based on the reproduction capability of the video output apparatus 11 having the lowest reproduction capability of reproducing the video data and the still image data. By doing this, it becomes possible for all the video output apparatuses 11 may appropriately (smoothly) reproduce the video data or the still image data.

FIG. 39A illustrates a reproduction capability list of a video output apparatus 1, and FIG. 39B illustrates a reproduction capability list of a video output apparatus 2. The resolution of the video output apparatus 1 is 2560×1600, and the resolution of the video output apparatus 2 is 1920×1080. Further, the maximum data resolution of the still image data of the video output apparatus 1 is 3840×2160, and the maximum data resolution of the still image data of the video output apparatus 2 is 1920×1080. Further, the maximum data rate and the maximum frame rate for the data resolution "640×360" of the video data of the video output apparatus 1 are "30" and "40", respectively, and the maximum data rate and the maximum frame rate for the data resolution "640×360" of the video data of the video output apparatus 2 are "40" and "50", respectively.

Figure 40:
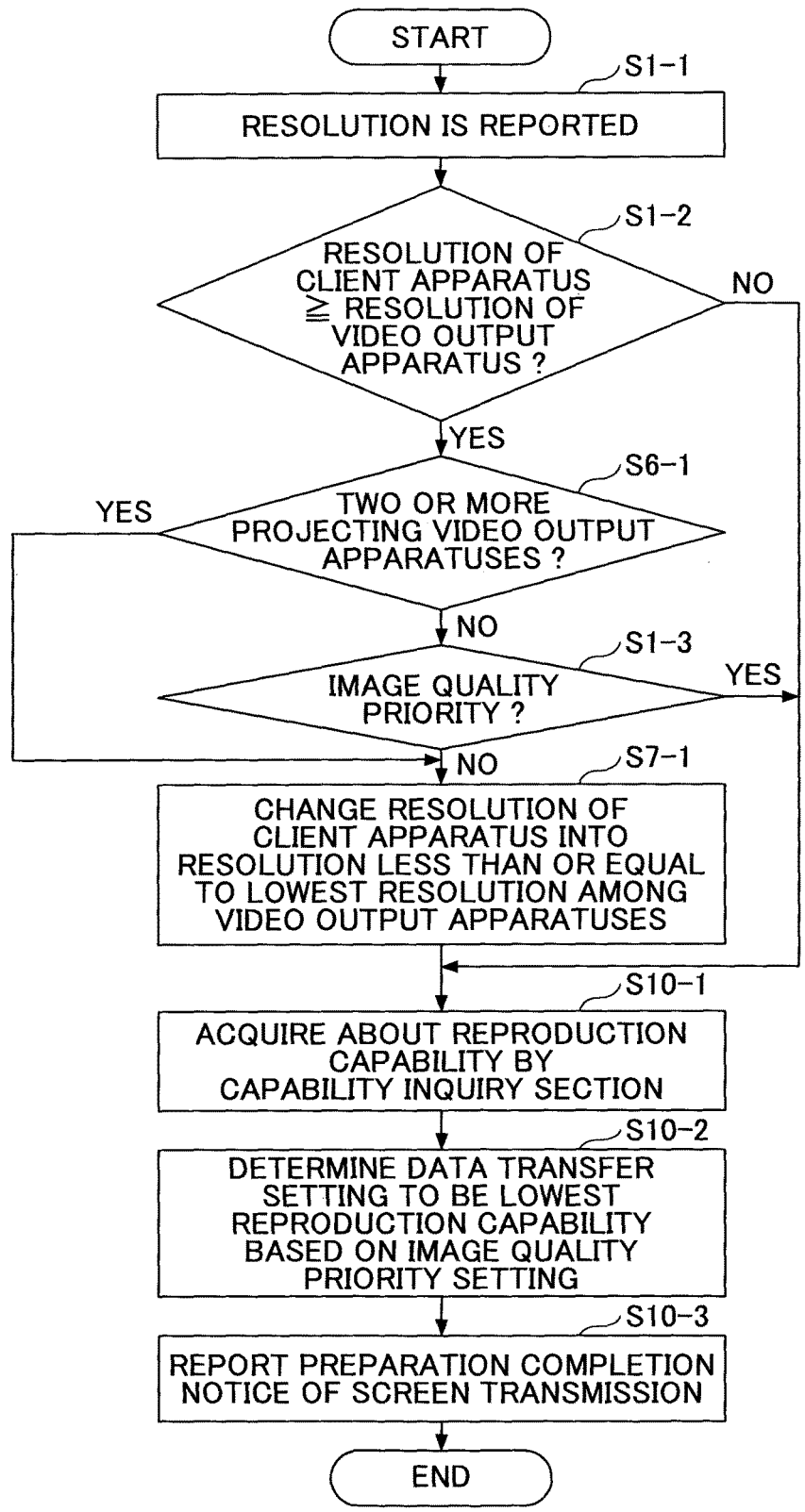
FIG. 40 is an example flowchart of a procedure for the resolution change determination section to determine the data transmission setting (tenth embodiment)

FIG. 40 is an example flowchart of a procedure where the resolution change determination section 62 determines the data transfer setting. The process from steps S1-1 through S7-1 is similar to that in the seventh embodiment of FIG. 31. Therefore, the repeated descriptions thereof are omitted.

When the resolution of the client apparatus is set to be lower than or equal to the lowest resolution of the video output apparatuses, the resolution change section 66 acquires the reproduction capability list which is inquired about by the capability inquiry section 75 (step 10-1). The reproduction capability list is transmitted from each of the video output apparatuses 11.

Next, the resolution change section 66 determines the data transfer setting based on the lowest reproduction capability depending on the setting of the image quality priority box 521 (step S10-2). In the example of FIG. 39, the data transfer setting is determined as described above.

In a case of image quality priority box=ON and the transmission of JPEG (still image data): When the data resolutions of the JPEG (still image data) of the two reproduction capability lists are compared, the maximum data resolution that both correspond to is 1280×720. In this case, both of the video output apparatuses 11 have the data resolution 1280×720. Therefore, attention is paid to the maximum frame rate. The maximum frame rates corresponding to the data resolution 1280×720 for the video output apparatuses 1 and 2 are "30" and "15", respectively. Therefore, the maximum frame rate of the video output apparatus 2 is less than that of the video output apparatus 1.

Therefore, the data transfer setting is limited based on the reproduction capability of the video output apparatus 2.

In a case of image quality priority box=ON and the transmission of H.264 (video data): When the data resolutions of the H.264 (video data) of the two reproduction capability lists are compared, the maximum data resolution that both correspond to is 1280×720. Further, the maximum frame rate that both correspond to in this maximum data resolution is "30". Therefore, the data transfer setting is limited based on the reproduction capability of the video output apparatus 1.

In a case of image quality priority box=OFF and the transmission of JPEG (still image data): In the case of image quality priority box=OFF, similar to the ninth embodiment, the resolution change section 66 selects one of the maximum data rate and the maximum frame rate which priority is placed on. In this case, it is assumed that the priority is placed on the maximum frame rate. The maximum of the maximum frame rate that both correspond to in the case of still image data is "15". Further, in the case of the maximum frame rate="15", the data resolution of the video output apparatus 1 is 1920×1080 and the data resolution of the video output apparatus 2 is 1280×720, which is lower. Therefore, the data transfer setting is limited based on the reproduction capability of the video output apparatus 2.

In a case of image quality priority box=OFF and the transmission of H.264 (video data): The maximum frame rate that both correspond to in video data is "40". Further, in the case of the maximum frame rate="40", the data resolution of the video output apparatus 1 is 640×360 and the data resolution of the video output apparatus 2 is 1280×720, which is higher. Therefore, the data transfer setting is limited based on the reproduction capability of the video output apparatus 1.

Next, the resolution change determination section 62 transmits the preparation completion notice of the screen data transmission to the screen transmission section 63 (step S10-3).

As described above, the client apparatus 21 limits the data transfer setting based on the lowest reproduction capability of video data or still image data of the video output apparatus 11 among a plurality of video output apparatuses 11. By doing this, it becomes possible for all the video output apparatuses 11 to appropriately (smoothly) reproduce the video data or the still image data.

Eleventh Embodiment

In this embodiment, a client apparatus 21 is described, which is included in a video output system further including a plurality of projectors, where the video output apparatus 11 having the highest reproduction capability is selected, so that the data transfer setting is limited based on the reproduction capability of the selected video output apparatus 11. The client apparatus 21 transmits the screen data to this video output apparatus 11 only. By doing this, only the video output apparatus 11 having the highest reproduction capability can smoothly reproduce the video data or the still image data.

Figure 41:
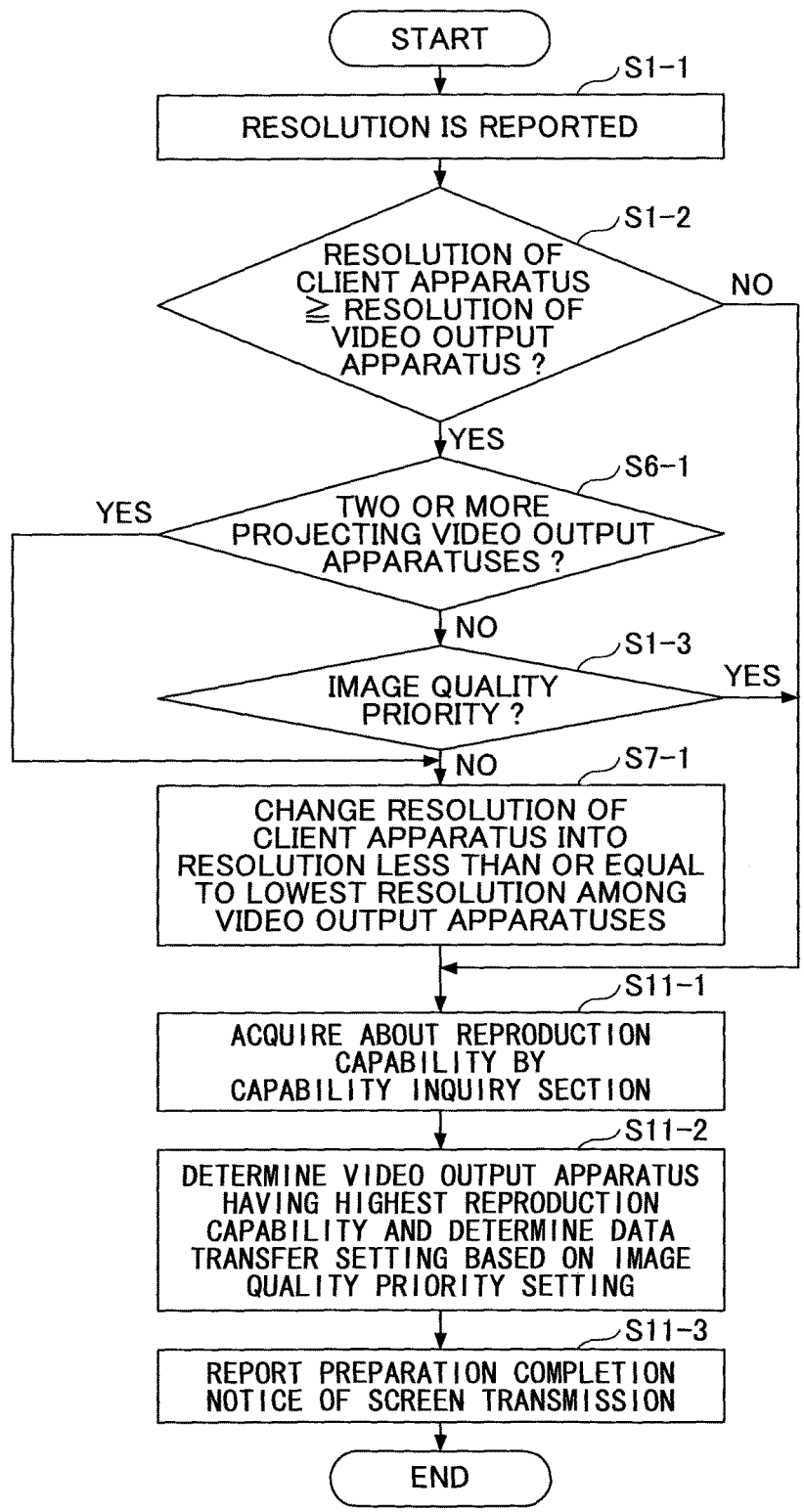
FIG. 41 is an example flowchart of a procedure for the resolution change determination section to determine the data transmission setting (eleventh embodiment)

FIG. 41 is an example flowchart illustrating a procedure in which the resolution change determination section 62 determines the data transfer setting. The process of steps S1-7 through S7-1 is similar to that of the seventh embodiment of FIG. 31, and the repeated descriptions thereof are omitted. Further, in this embodiment, the resolution of the client apparatus may be set based on the resolution of the video output apparatus having the highest reproduction capability described below.

In step S7-1, when the resolution of the client apparatus is set to be lower than or equal to the lowest resolution of the video output apparatus, the resolution change section 66 acquires the reproduction capability lists inquired about by the capability inquiry section 75 (step S11-1). The reproduction capability lists are transmitted from the corresponding video output apparatuses 11.

Next, the resolution change section 66 determines the video output apparatus having the highest reproduction capability based on the setting of the image quality priority box 521 and determines the data transfer setting based on the reproduction capability of the determined video output apparatus (step S11-2). In the example of FIG. 39, the determination is made based on the following.

In a case of image quality priority box=ON and the transmission of JPEG (still image data): In this case, when the data resolutions of the JPEG (still image data) of the two reproduction capability lists are reviewed, the maximum data resolution is 3840×2160 in the video output apparatus 1. Therefore, the data transfer setting is limited based on the reproduction capability of the video output apparatus 1.

In a case of image quality priority box=ON and the transmission of H.264 (video data): In this case', when the data resolutions of the H.264 (video data) of the two reproduction capability lists are reviewed, the maximum data resolution is 1920×1080 in the video output apparatus 1. Therefore, the data transfer setting is limited based on the reproduction capability of the video output apparatus 1.

In a case of image quality priority box=OFF and the transmission of JPEG (still image data): For example, in the case of "frame rate of still image data=15" in the client apparatus 21, the highest data resolutions in the video output apparatuses 1 and 2 are 1920×1080 and 1280×720, respectively. Therefore, the data transfer setting is limited based on the reproduction capability of the video output apparatus 1. Further, attention may be paid only to the maximum frame rate of JPEG (still image data) of the two reproduction capability lists. The maximum of the maximum frame rate is "30" in the video output apparatus 1. Therefore, the data transfer setting is limited based on the reproduction capability of the video output apparatus 1.

In a case of image quality priority box=OFF and the transmission of H.264 (video data): For example, in the case of "the frame rate of the still image data=15" of the client apparatus 21, the highest data resolutions in the video output apparatuses 1 and 2 are 640×360 and 1280×720, respectively. Therefore, the data transfer setting is limited based on the reproduction capability of the video output apparatus 2. Further, attention may be paid only to the maximum frame rate of H.264 (video data) in the two reproduction capability lists. The maximum of the maximum frame rate is "50" in the video output apparatus 2. Therefore, the data transfer setting is limited based on the reproduction capability of the video output apparatus 2.

Next, the resolution change determination section 62 transmits the preparation completion notice of the screen data transmission to the screen transmission section 63 (step S11-3).

As described above, the client apparatus 21 limits the data transfer setting based on the reproduction capability of the video output apparatus having the highest reproduction capability of the video data or the still image data among a plurality of the video output apparatuses 11. By doing this, the video output apparatus having the highest reproduction capability can appropriately (smoothly) reproduce the video data or the still image data.

Twelfth Embodiment

In this embodiment, a client apparatus 21 is described which is included in a video output system further including a plurality of projectors. The client apparatus 21 is capable of generating appropriate screen data in accordance with, the reproduction capabilities of the projectors. By so doing, the video output apparatuses 11 may reproduce the video data or the still image data by using each of the video output apparatuses to a maximum extent in accordance with the reproduction capability of each the video output apparatus 11.

Figure 42:
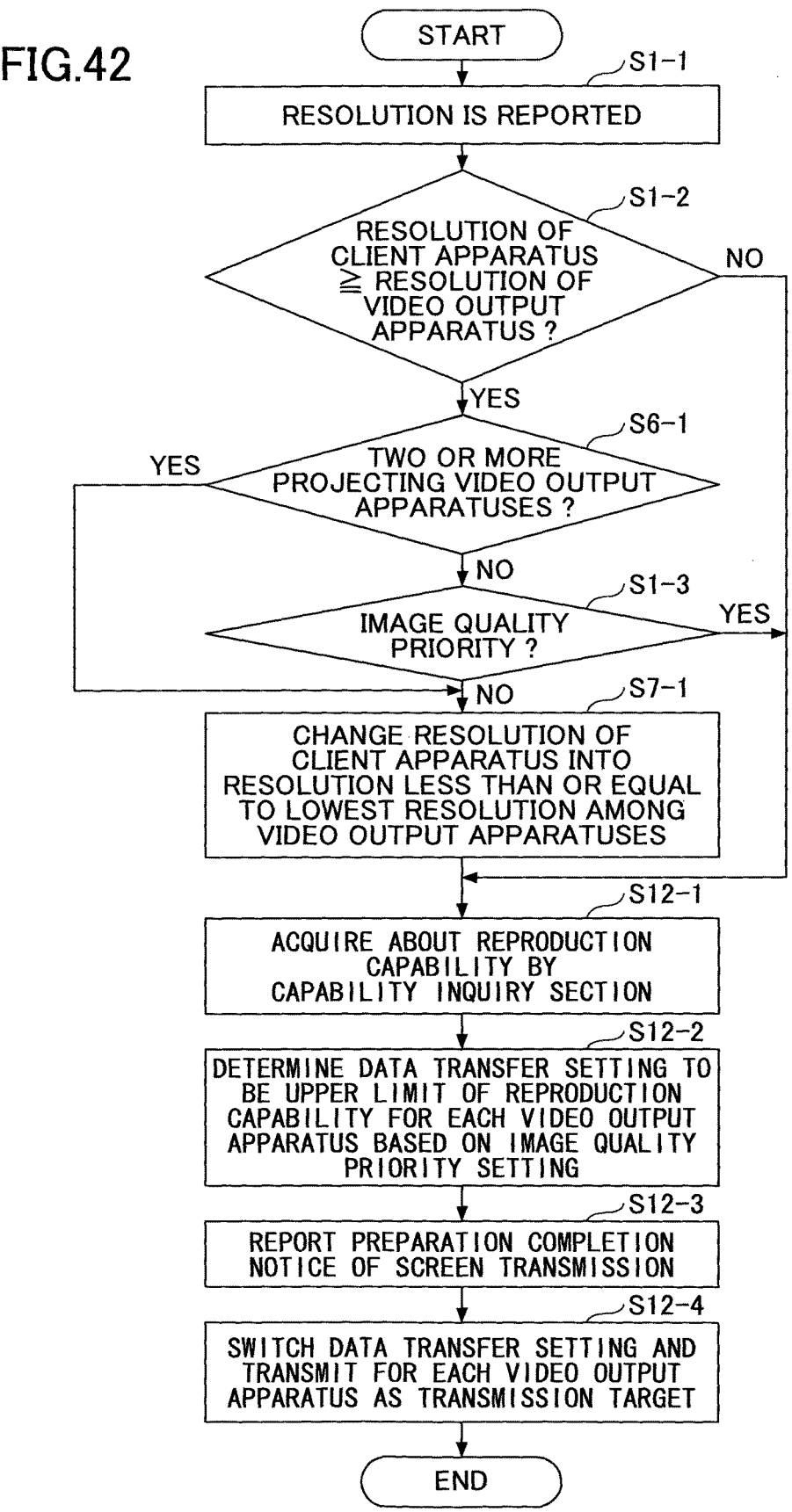
FIG. 42 is an example flowchart of a procedure for the resolution change determination section to determine the data transmission setting (twelfth embodiment).

FIG. 42 is an example flowchart of a procedure in which the resolution change determination section 62 determines the data transfer setting. The process of steps S1-1 through S7-1 is similar to that in the seventh embodiment of FIG. 31, and the repeated descriptions thereof are omitted.

In step S7-1, since the resolution of the client apparatus is changed so as to be less than or equal to the resolution of the video output apparatus 11 having the lowest resolution, the resolution change section 66 acquires the reproduction capability lists inquired about by the capability inquiry section 75 (step S12-1). The reproduction capability lists are transmitted from the respective video output apparatuses 11.

Next, the resolution change section 66 limits the data transfer settings to be lower than or equal to the respective reproduction capabilities of the video output apparatuses 11 based on the setting of the image quality priority box (step S12-2). The data transfer setting is separately determined for each of the video output apparatuses 11. The method of determining the data transfer setting is the same as that in the ninth embodiment.

The resolution change determination section 62 transmits the preparation completion notice of the screen data transmission to the screen transmission section 63 (step S12-3).

Then, the projection section 83 transmits by changing the data transfer setting for each of the video output apparatuses 11 of the transmission destinations (step S12-4).

Therefore, the client apparatus 21 may generate appropriate screen data in accordance with each of the reproduction capabilities of the video output apparatuses 11, so that the video data or the still image data can be reproduced by utilizing the respective reproduction capabilities of the video output apparatuses 11 to a maximum extent.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application Nos. 2013-050872 filed Mar. 13, 2013 and 2013-272835 filed Dec. 27, 2013, the entire contents of which are hereby incorporated herein by reference.

DESCRIPTION OF THE REFERENCE NUMERALS

11: VIDEO OUTPUT APPARATUS
21: CLIENT APPARATUS
34: IMAGE PROCESSING SECTION
35: NETWORK DATA PROCESSING SECTION
61: RESOLUTION INQUIRY SECTION
62: RESOLUTION CHANGE DETERMINATION SECTION
63: SCREEN TRANSITION SECTION
81: RESOLUTION REPORT SECTION
82: SCREEN RECEIVING SECTION
83: PROJECTION SECTION
100: VIDEO OUTPUT SYSTEM

PRIOR ART DOCUMENTS

[Patent Document 1] Japanese Laid-Open Patent Publication No. 2005-339256

The invention claimed is:

1. An information processing apparatus in communication with a video output apparatus via a wireless communication network, comprising:
   a screen display unit configured to output a screen on a display apparatus;
   a screen data acquisition unit configured to acquire screen data of the screen;
   a screen data transmission unit configured to transmit the screen data to the video output apparatus via the wireless communication network;
   an apparatus capability acquisition unit configured to inquire about an apparatus capability of the video output apparatus and acquire the apparatus capability from the video output apparatus, wherein the apparatus capability refers to a resolution of the video output apparatus;
   one of a resolution change unit configured to change a screen resolution of the screen which is output by the screen display unit in accordance with the apparatus capability or an acquisition range change unit configured to change a range, which is acquired by the screen data acquisition unit, in accordance with the apparatus capability into a part of the screen data; and
   a quality setting reception unit configured to accept a quality setting of the screen data which is transmitted by the screen data transmission unit,
   wherein the resolution change unit is configured, when the quality setting permits lowering of quality of the screen data, to change the screen resolution of the screen, which is output by the screen display unit, in accordance with the resolution, and
   wherein the acquisition range change unit is configured to change the range, which is acquired by the screen data acquisition unit, in accordance with the resolution into a part of the screen data.

2. The information processing apparatus according to claim 1,
   wherein the resolution change unit is configured to
   acquire an update time interval of images which are projected by the video output apparatus,
   when the update time interval is greater than or equal to a second threshold value and only when the quality setting permits the lowering of the quality of the screen data, change the screen resolution of the screen, which is output by the screen display unit, in accordance with the resolution, and
   when the update time interval is less than the second threshold value, change the screen resolution of the screen, which is output by the screen display unit, into the screen resolution which was set before the resolution change unit changed.

3. The information processing apparatus according to claim 1, further comprising:

a specification acquisition unit configured to acquire a specification of the information processing apparatus, wherein the resolution change unit is configured to, even when the quality setting does not permit the lowering of the quality of the screen data and when the specification is not higher than a reference value, change the screen resolution of the screen, which is output by the screen display unit, in accordance with the resolution.

4. The information processing apparatus according to claim 1, further comprising:

a range information generation unit configured to monitor the screen and generate range information of a range where change is detected, wherein regardless of whether the quality setting does not permit the lowering of the quality of the screen data, the resolution change unit is configured to when the range information is greater than or equal to a first threshold value, change the screen resolution of the screen, which is output by the screen display unit, in accordance with the resolution and when the range information is less than the first threshold value, change the screen resolution of the screen, which is output by the screen display unit, into the screen resolution which was set before the resolution change unit changed.

5. The information processing apparatus according to claim 1, wherein when the screen data transmission unit transmits the screen data to a plurality of the video output apparatuses via the wireless communication network, regardless of whether the quality setting permits the lowering of the quality of the screen data, the resolution change unit is configured to change the screen resolution of the screen, which is output by the screen display unit, in accordance with the apparatus capability.

6. The information processing apparatus according to claim 5, wherein the apparatus capability acquisition unit is configured to inquire about the apparatus capability of the plurality of video output apparatuses and acquire the apparatus capability from the plurality of video output apparatuses, and wherein the resolution change unit is configured to change the screen resolution of the screen, which is output by the screen display unit, in accordance with the apparatus capability which is the lowest among the plurality of video output apparatuses or limit transmission capability of transmitting the screen data by the screen data transmission unit.

7. The information processing apparatus according to claim 5, further comprising:

a communication cut detection unit configured to detect cut of communication with one or more video output apparatuses among the plurality of video output apparatuses, wherein when the communication cut detection unit detects cut of the communication, the resolution change unit is configured to change the screen resolution of the screen, which is output by the screen display unit, in accordance with the resolution which is the lowest among one or more resolutions transmitted by one or more video output apparatuses whose communications are not cut.

8. The information processing apparatus according to claim 6, wherein the resolution change unit is configured to change the screen resolution of the screen, which is output by the screen display unit, in accordance with the resolution which is the lowest among the plurality of the video output apparatuses.

9. The information processing apparatus according to claim 6, wherein the resolution change unit is configured to limit the transmission capability of transmitting the screen data by the screen data transmission unit to be less than or equal to the display capability which is the lowest among the plurality of the video output apparatuses.

10. The information processing apparatus according to claim 5, wherein the resolution change unit is configured to determine the video output apparatus having the highest display capability among the plurality of video output apparatuses and limit transmission capability of transmitting the screen data by the screen data transmission unit to be less than or equal to the display capability of the determined video output apparatus.

11. The information processing apparatus according to claim 5, wherein the resolution change unit limits transmission capability of transmitting the screen data by the screen data transmission unit to be less than or equal to the display capability of corresponding ones of the plurality of video output apparatuses, and wherein the screen data transmission unit is configured to transmit the screen data based on the limited transmission capability of the corresponding ones of the plurality of video output apparatuses.

12. A non-transitory computer readable storage medium comprising a computer executable program causing an information processing apparatus in communication with a video output apparatus via a wireless communication network to execute a method comprising:

a screen display step of outputting a screen on a display apparatus;

a screen data acquisition step of acquiring screen data of the screen;

a screen data transmission step of transmitting the screen data to the video output apparatus via the wireless communication network;

a quality setting acceptance step of accepting a quality setting of the screen data transmitted in the screen data transmission step;

an apparatus capability acquisition step of inquiring about an apparatus capability of the video output apparatus and acquiring the apparatus capability from the video output apparatus, wherein the apparatus capability refers to a resolution of the video output apparatus; and one of a resolution change step of changing a screen resolution of the screen which is output in the screen display step in accordance with the apparatus capability or an acquisition range change step of changing a range, which is acquired in the screen data acquisition step, in accordance with the apparatus capability into a part of the screen data, wherein the resolution change step includes, when the quality setting permits lowering of quality of the screen data, changing the screen resolution of the screen in accordance with the resolution, and the acquisition range changing step includes changing the range in accordance with the resolution into a part of the screen data.

13. A video output system, comprising:

a video output apparatus; and an information processing apparatus in communication with the video output apparatus via a wireless communication network,
wherein the information processing apparatus includes
a screen display unit configured to output a screen on a display apparatus;
a screen data acquisition unit configured to acquire screen data of the screen;
a screen data transmission unit configured to transmit the screen data to the video output apparatus via the wireless communication network;
an apparatus capability acquisition unit configured to inquire about an apparatus capability of the video output apparatus and acquire the apparatus capability from the video output apparatus, wherein the apparatus capability refers to a resolution of the video output apparatus;
a quality setting reception unit configured to accept a quality setting of the screen data which is transmitted by the screen data transmission unit; and
one of a resolution change unit configured to change a screen resolution of the screen which is output by the screen display unit in accordance with the apparatus capability or an acquisition range change unit configured to change a range, which is acquired by the screen data acquisition unit, in accordance with the apparatus capability into a part of the screen data,
wherein the resolution change unit is configured, when the quality setting permits lowering of quality of the screen data, to change the screen resolution of the screen, which is output by the screen display unit, in accordance with the resolution,
the acquisition range change unit is configured to change the range, which is acquired by the screen data acquisition unit, in accordance with the resolution into a part of the screen data, and
the video output apparatus includes
a resolution report unit configured to report the apparatus capability in response to an inquiry from the apparatus capability acquisition unit;
a screen data receiving unit configured to receive the screen data; and
an output unit configured to output the screen data.

* * * * *